Oct. 26, 1971 A. J. PROBERT ET AL 3,614,995
ZONED ELEVATOR CONTROL SYSTEM INCLUDING AN ARRANGEMENT FOR
INCREASING THE NUMBER OF CARS WHICH CAN RESPOND TO
LANDING CALLS IN ANY OF THE ZONES
Filed April 24, 1969 10 Sheets-Sheet 5

INVENTORS
ALFRED JOHN PROBERT
JOHN JOSEPH FAUP
BY ATTORNEY

United States Patent Office

3,614,995
Patented Oct. 26, 1971

3,614,995
ZONED ELEVATOR CONTROL SYSTEM INCLUDING AN ARRANGEMENT FOR INCREASING THE NUMBER OF CARS WHICH CAN RESPOND TO LANDING CALLS IN ANY OF THE ZONES
Alfred John Probert, Farmingdale, and John Joseph Faup, Yonkers, N.Y., assignors to Otis Elevator Company, New York, N.Y.
Filed Apr. 24, 1969, Ser. No. 818,917
Int. Cl. B66b 1/20
U.S. Cl. 187—29 R
14 Claims

ABSTRACT OF THE DISCLOSURE

A zoned elevator control system for a group of cars in which the cars are distributed on a predetermined apportioned basis into various zones of the building, whereupon in the absence of calls each car is brought to a stop at a landing in the zone it is occupying. Thereafter in a zone occupied by a car the response to the first landing call is limited to a car located in that zone. A landing call in a zone in which no car is located starts a car located in the nearest lower zone. The level of traffic in each zone is measured individually. An up or a down landing call in registration in any zone continuously for a predetermined period without an up or a down landing call respectively being cancelled indicates the zone is a heavy demand zone. As a result the limitation on the response to landing calls to a car located in that zone is removed. This enables a car in the nearest lower zone to respond to landing calls in the heavy traffic demand zone notwithstanding another car is occupying that zone. In addition while the heavy traffic demand continues any car in a zone which is in excess of the apportioned number of cars for that zone is prevented from traveling to an unoccupied zone as it otherwise would and is caused to travel to the heavy traffic demand zone. The heavy traffic demand indication is terminated by the cancellation of a landing call for the same direction as the landing call whose continuous registration instituted the demand.

---

This is an invention in the elevator art. It is concerned particularly with a system for controlling the operation of a group of elevator cars in a multi-story building.

A recent development in supervisory control for a group of elevators, the so-called zone elevator control system, has proven itself in a great many diverse types of buildings to be an outstanding arrangement for controlling a group of elevator cars to provide efficient service during most if not all periods of the day and night. Such systems operate to divide the buildings they serve into a predetermined number of zones, each containing a predetermined number of landings. Each of the zones in a building is assigned the services of a predetermined number of cars provided they are located therein. Unless responding to calls, a car which is not assigned to the zone it is in is forced to travel until it is ultimately located in a zone to which it becomes assigned. In this way in the absence of calls the cars are distributed on an apportioned basis into the various zones of the building. A landing call registered in a zone which is not occupied by a car causes a car located in the nearest lower occupied zone to respond thereto whereas the occupation of a zone by a car limits the response to landing calls to a car located in that zone.

This last mentioned operation is highly desirable in that it frees cars in other zones from the necessity of traveling in an attempt to respond to landing calls in an already occupied zone and, consequently, permits them to respond more quickly to calls in their own zones. However, it is important to safeguard against the situation in which a car assigned to a zone breaks down in such a way as to disable itself from responding to landing calls in its particular zone while at the same time preventing the other cars in the system from responding to such calls.

It is an object of this invention to provide a safeguard against such a breakdown.

In addition to safeguarding the system it is also desirable to provide additional service to a zone, notwithstanding there is a car occupying it, should a heavy traffic demand arise therein.

It is therefore another object of this invention to provide an arrangement for measuring the level of the traffic demand in a zone.

It is a further object of this invention to provide apparatus which operates in response to a predetermined level of traffic demand to enable a car to respond to landing calls in a zone other than the one in which it is located even though it would otherwise be prevented from so responding.

It is additionally desirable to provide a zone elevator control system with apparatus to enable it to serve efficiently in those circumstances in which predeominantly all the passengers are up travelers who enter a car at the main landing of a building.

It is therefore yet another object of this invention to provide apparatus which operates in response to predominant up traffic to prevent cars from being assigned to predetermined zones and to cause them to travel to the main landing from which they are dispatched upwardly at timed intervals.

It is still another object of this invention to provide apparatus which prevents a car from opening its doors at the main landing upon its arrival thereat unless it is stopping in answer to a call for that landing and which also provides a preference selection arrangement for selecting a car with its doors open for dispatch from the main landing in preference to one with its doors closed.

In carrying out the invention according to the disclosed preferred embodiment there is provided an elevator control system for a plurality of elevator cars. The cars serve a plurality of landings in a building including a main landing by starting in response to the operation of individual starting switches and by stopping in response to calls registered in said cars and at said landings. Landing calls include both up and down landing calls. These and car calls are both canceled when a car stops in response to them. The system segregates the landings into a plurality of groups of landings and effectively divides the building into a plurality of zones. Furthermore, the system comprises control means which includes an assignment switch individual to each car. Each assignment switch is capable of being actuated when its respective car occupies a zone and is the only car present therein. The control means also includes a zone switch individual to each zone. Each zone switch is capable of being actuated when any one of the cars occupies its respective zone. Upon being actuated a zone switch limits the response to landing calls registered in its zone to a car that is located therein.

The control system also includes an up traffic switch which is actuated upon the indication of a predetermined traffic condition in which predominantly all the passengers are up travelers who commenced traveling in the system by entering a car at the main landing. This condition is indicated by the upward departure from the main landing within a predetermined period of two cars, each carrying a specific passenger load as signified by the operation of its individual load weighing device.

In the absence of this predetermined traffic condition as signified by the unactuated condition of the up traffic switch, an unactuated assignment switch operates the starting switch of its respective car to cause it to move toward a zone whose zone switch is unactuated. This causes the cars to distribute themselves into the various zones on a predetermined apportioned basis.

In addition, the control system includes traffic measuring means individual to specific ones of the zones. Each traffic measuring means includes a heavy traffic switch which is actuated in response to the existence of a predetermined level of traffic in its associated zone. Indicative of this level of traffic in any zone is the continuous registration of a landing call in that zone for a predetermined period. More particularly, this predetermined level of traffic in a zone is indicated by the continuous registration of an up landing call in that zone for an uninterrupted period during which no up landing call is cancelled in that zone or by the continuous registration of a down landing call in that zone for an uninterrupted period during which no down landing call is cancelled in that zone.

An actuated heavy traffic switch for a particular zone removes the limitation on the response to landing calls provided by the zone switch for that particular zone. This enables a car outside that zone to respond to landing calls registered therein notwithstanding the zone switch for that zone is actuated. More particularly, the actuation of the heavy traffic switch for a particular zone enables the starting switch of a car in a nearby occupied zone to start its car in response to landing calls in that particular zone. Specifically, the starting switch of a car in the next occupied zone below the particular zone is enabled to start its car. If there is no occupied zone below the particular zone the starting switch of a car in the next occupied zone above the particular zone is enabled to start its car.

Moreover an actuated heavy traffic switch prevents the starting switch of a car whose assignment switch is unactuated from causing movement of the car toward a zone whose zone switch is unactuated. And if the up traffic switch is unactuated, the actuated heavy traffic switch for a particular zone operates the starting switch of a car whose assignment switch is unactuated to cause movement of the car toward that particular zone.

An actuated heavy traffic switch is restored to its unactuated condition either upon the cancellation of an up landing call in its respective zone if it was actuated in response to the continuous registration of an up landing call or upon the cancellation of a down landing call in its respective zone if it was actuated in response to the continuous registration of a down landing call.

Actuation of the up traffic switch causes the operation of dispatching equipment which dispatches cars from the main landing at regular time intervals if at the end of an interval a call is in registration to which the car to be dispatched can respond. Otherwise the dispatching equipment dispatches the car upon the registration of the first call to which it can respond after the elapse of the dispatching interval for the car.

Actuation of the up traffic switch also prevents actuation of the assignment switch of any car occupying predetermined ones of the zones for which traffic measuring means is provided or of any car traveling down in any one of the zones for which traffic measuring means is provided. This occurs notwithstanding a car may be the only one occupying one of these predetermined zones. This provides cars for dispatching from the main landing since actuation of the up traffic switch operates the starting switches of all cars whose assignment switches are unactuated to cause them to move toward that landing.

Furthermore, actuation of the up traffic switch prevents actuation of the zone switch of any zone for which traffic measuring means are provided unless an up traveling car is occupying that zone. This enables up traveling cars below a zone occupied by a down traveling car to respond to up and down hall calls above the down traveling car.

In addition, the control system includes an individual car door for each car, a hoistway door for each car at each landing at which the associated car can stop and door operating means for each car for operating its associated car and hoistway doors between opened and closed positions while its associated car is located at a landing. Control circuitry, also included in the elevator system, individual to each car prevents its respective car's door operating means from operating its associated car and hoistway doors to their opened positions at any landing unless the car is responding to a call at that landing. Once the doors of a car are opened at the main landing, though, the control circuitry for that car maintains them in that position until the car's starting switch is operated. As a result, in order to have the selection equipment of the control system, which selects cars for dispatch from the main landing under up traffic conditions, operate satisfactorily, a preference arrangement is included in that equipment so that it always selects a car whose doors are opened in preference to one whose doors are closed.

Other objects, features and advantages of the invention will be apparent to those skilled in the elevator art from the foregoing and from the following description and appended claims when considered in conjunction with the accompanying drawing, in which, FIG. 1 is a schematic diagram of the elevator equipment for one elevator car including some of the control circuits therefor in straight line form;

Figures 1, 2:
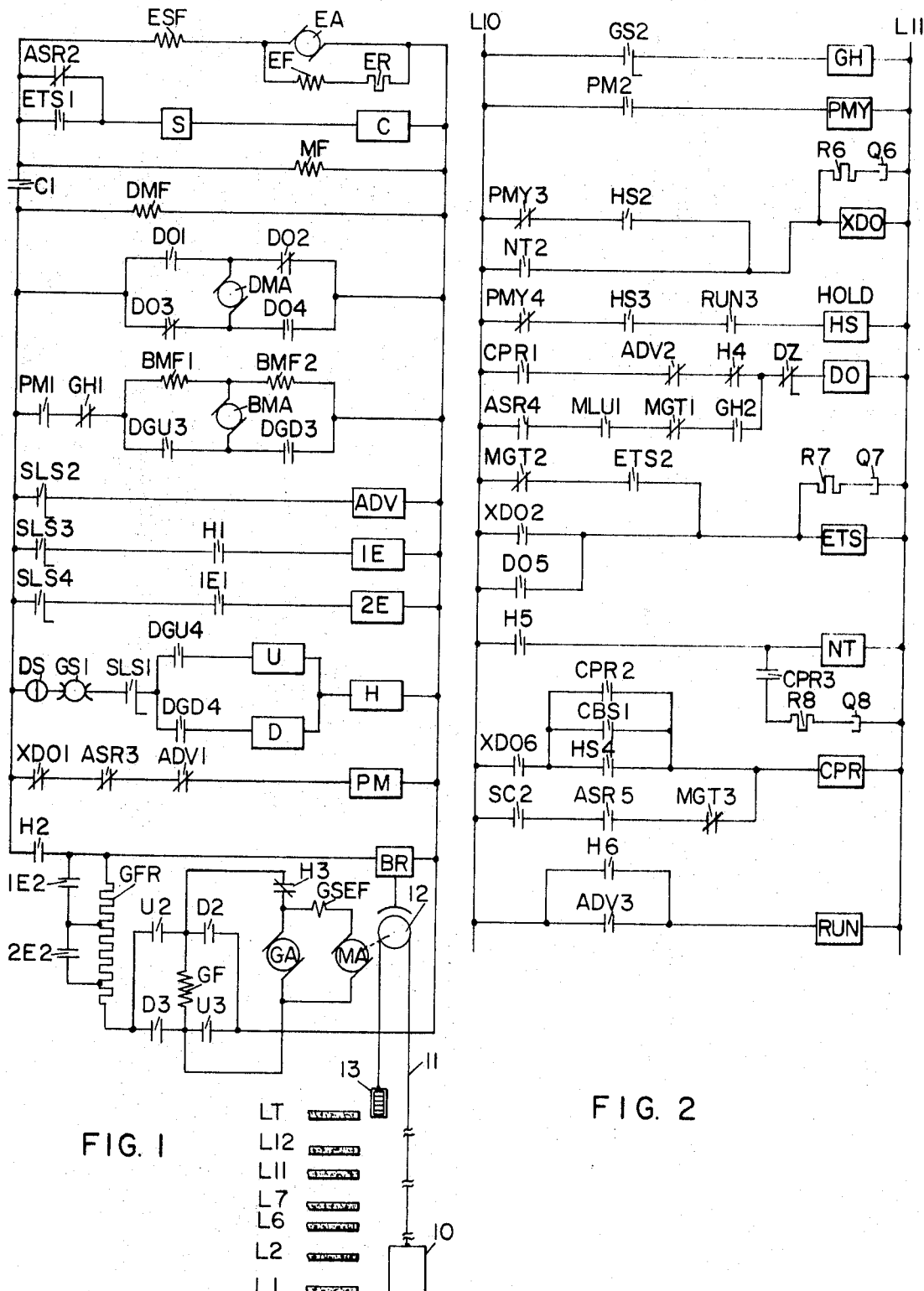
FIGS. 2, 3 and 4 are schematic wiring diagrams in straight line form of some of the operating circuits for the elevator car of FIG. 1.
Figure 10B:
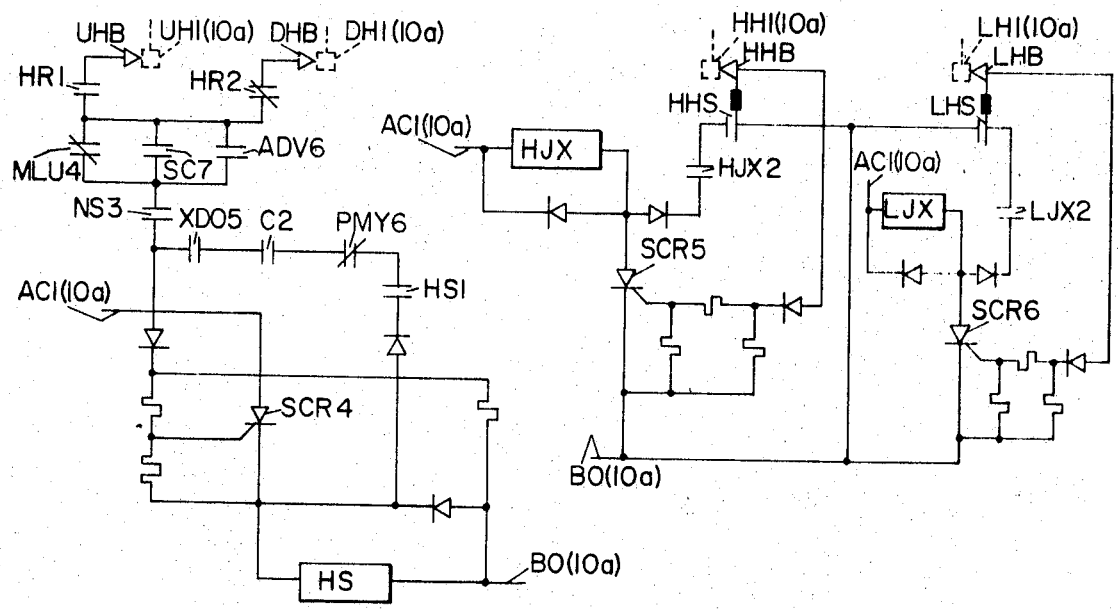
Figure 10A:
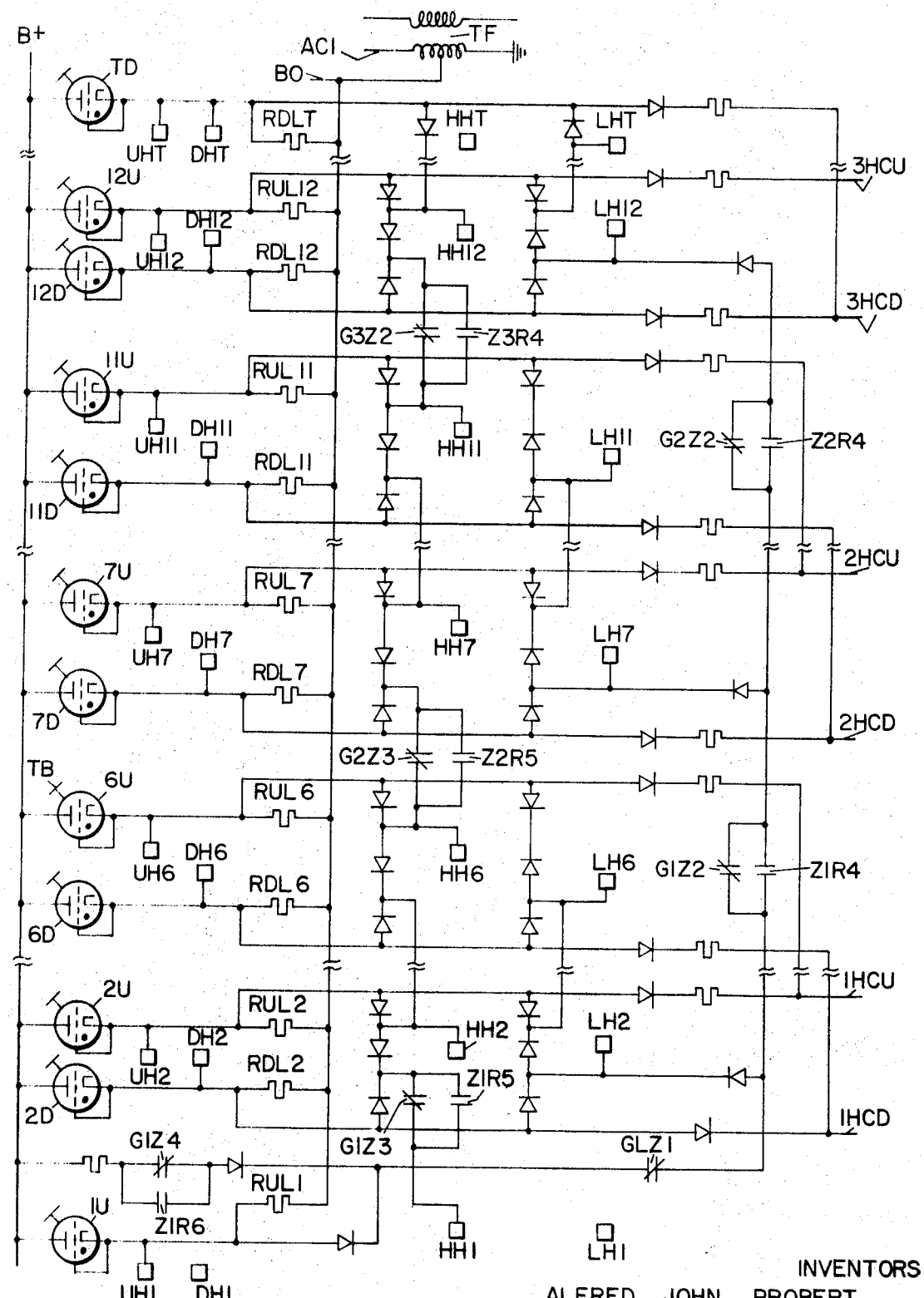
Figure 11:
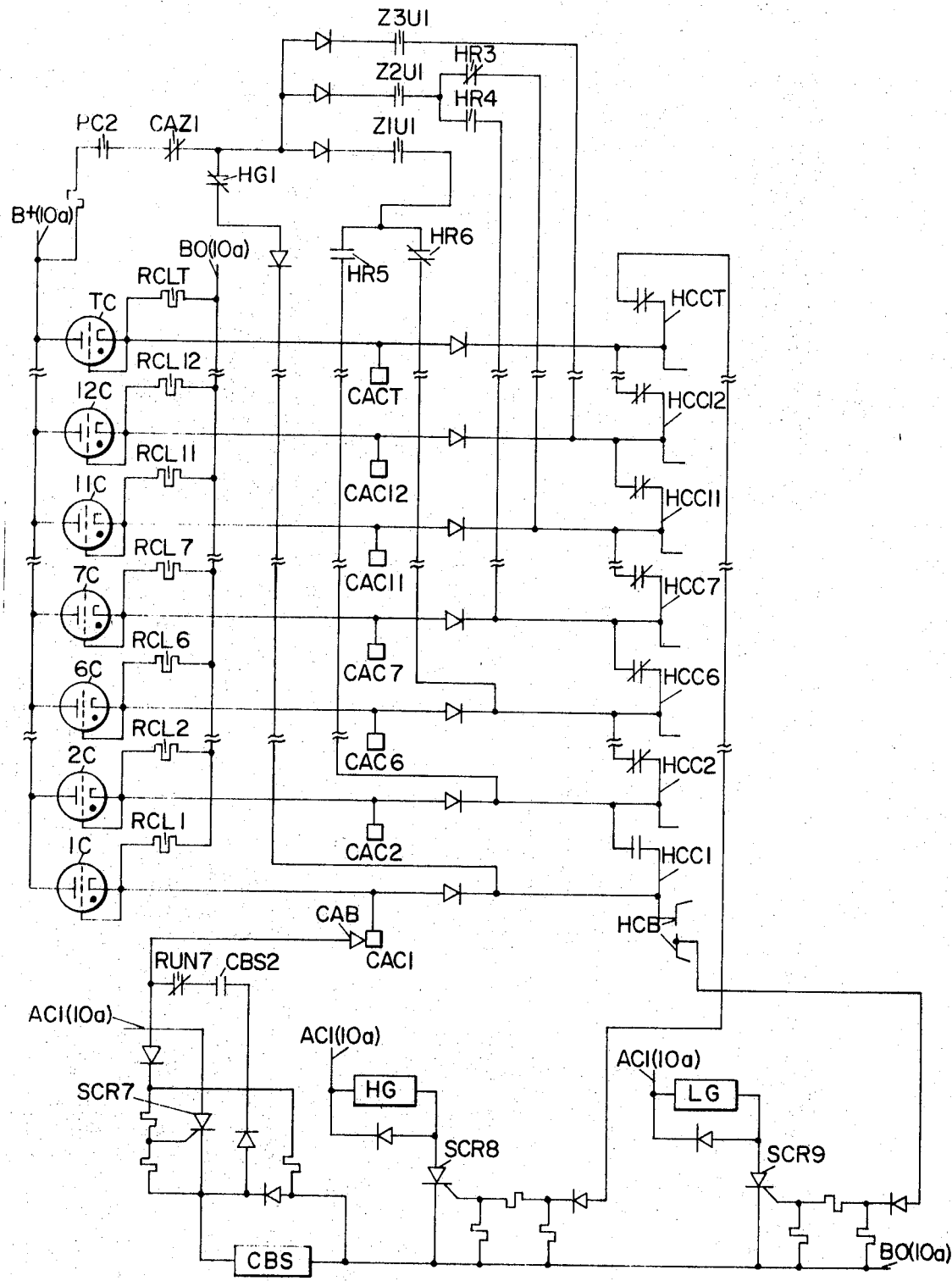
Figure 12:
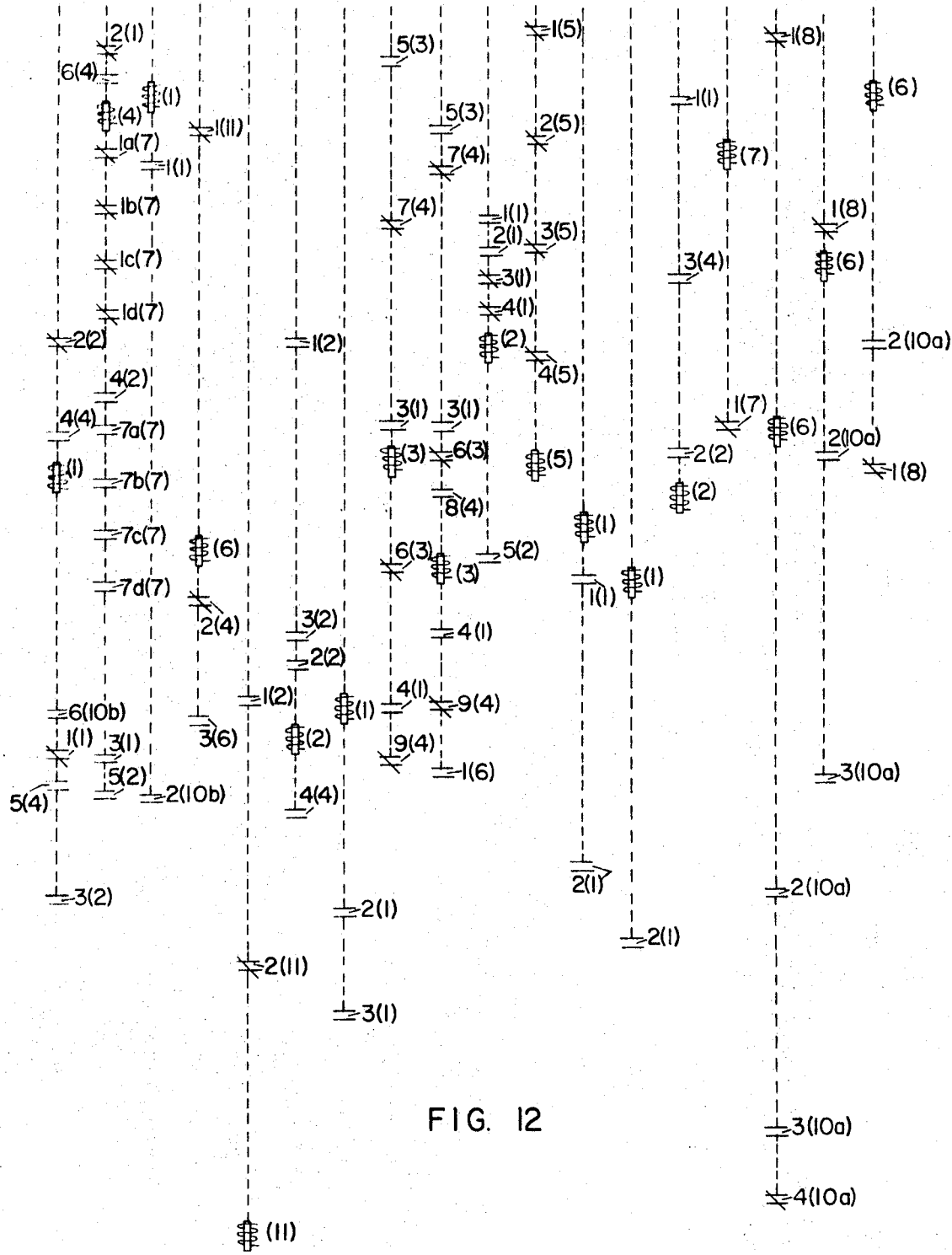
Figure 13:
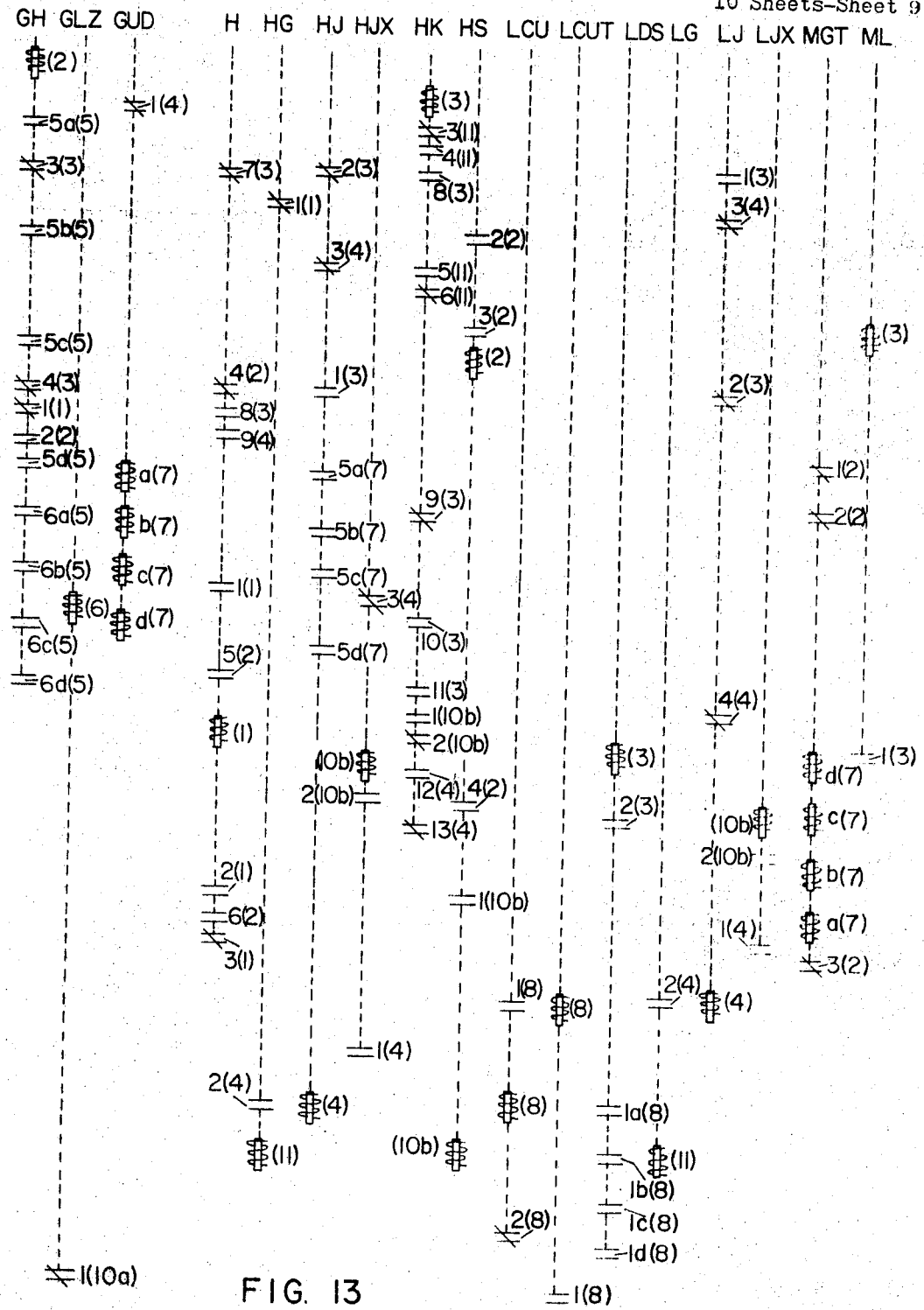
Figure 14:
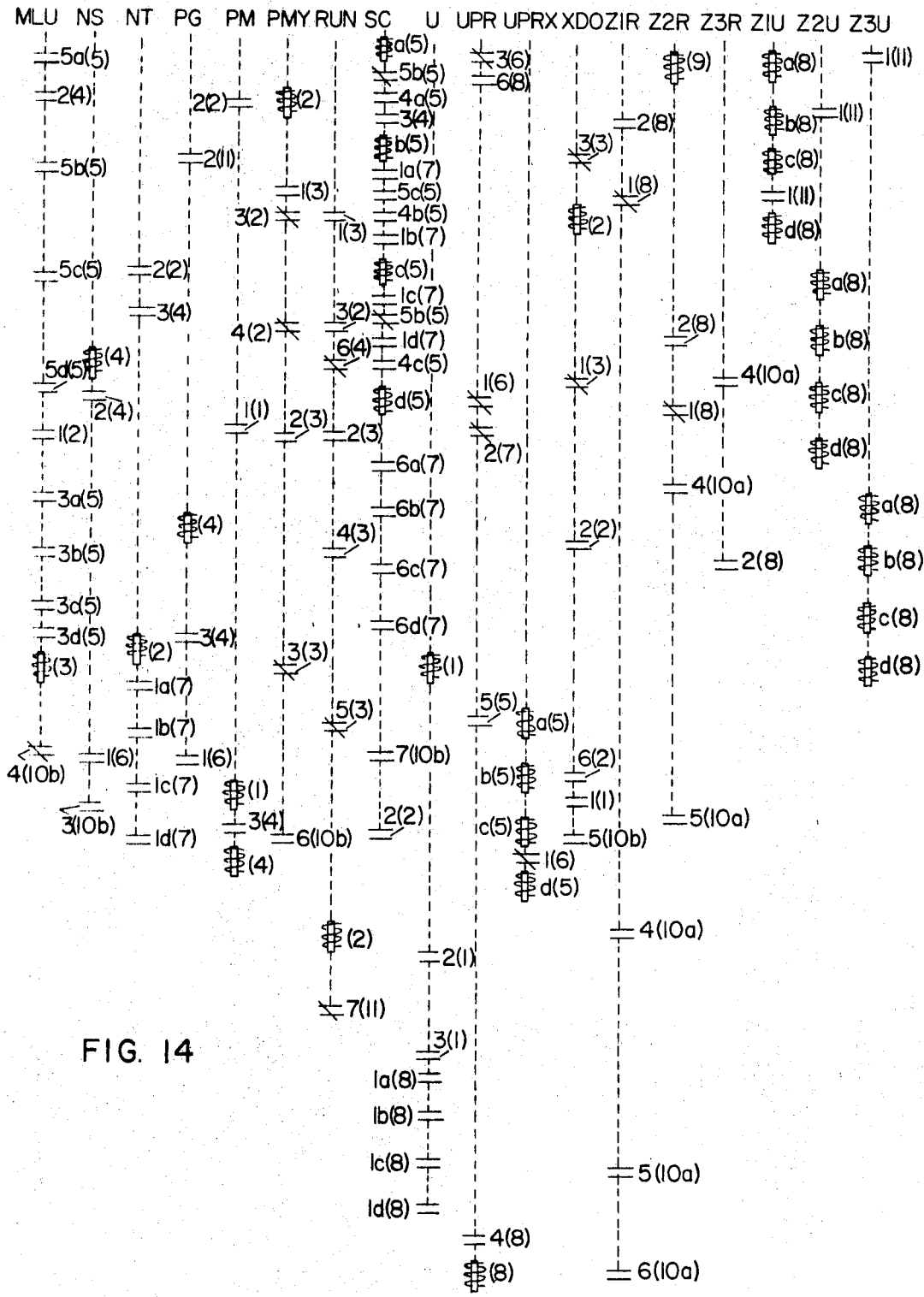

FIGS. 10a and 10b together form a schematic wiring diagram of some of the hall call circuits employed with the four car group system disclosed herein together with the hall call above, hall call below and the hall call stopping and cancellation circuits of the one car in the group shown in FIG. 1;

FIG. 11 is a schematic wiring diagram of the car call circuits for the elevator car shown in FIG. 1;

FIGS. 12 to 14 are key sheets in spindle form for locating the coils and contacts of the individual switches and relays shown in the other figures of the diagram.

In alphabetical order, the electro-magnetic switches disclosed herein and the reference characters and names used in conjunction with each are ADV—Advanced advancer switch
ASR—Automatic start switch
C—Potential switch
CAZ—Car assignment switch
CBS—Car call stop switch
CPR—Call stop switch
D—Down switch
DGD—Down direction switch
DGU—Up direction switch
DO—Door control switch
DOP—Door open preference switch
1E—First speed switch
2E—Second speed switch
ETS—Excitation time switch
FUT—Up dispatch timer switch
G1Z—First zone switch
G2Z—Second zone switch
G3Z—Third zone switch
GH—Door open switch GLZ—Main landing zone switch
GUD—Up dispatch switch
H—Field and brake switch
HG—Car call above switch
HJ—Call above switch
HJX—Hall call above switch
HR—Reversal switch
HS—Hall call stop switch
LCU—Loaded car up switch
LCUT—Loaded car up timing switch
LDS—Load dispatch switch
LG—Car call below switch
LJ—Call below switch
LJX—Hall call below switch
MGT—Motor generator time switch
ML—Main landing switch
MLU—Main landing up switch
NS—Non stop switch
NT—Door open time switch
PC—Passed call switch
PM—Pawl magnet switch
PMY—Auxiliary pawl magnet switch
RUN—Running switch
SC—Selected car switch
U—Up switch
UPR—Up traffic switch
UPRX—Auxiliary up traffic switch
XDO—Auxiliary door control switch
Z1R—First zone heavy traffic switch
Z2R—Second zone heavy traffic switch
Z3R—Third zone heavy traffic switch
Z1U—First zone call switch
Z2U—Second zone call switch
Z3U—Third zone call switch With the following exceptions all of the above switches have single, two lead actuating coils. The first, second and third zone switches G1Z, G2Z and G3Z have single, three lead actuating coils. These switches are operated to their actuated condition as long as current flows through any portion of their coils and are operated to their unactuated condition upon the cessation of current flow through their coils. Reversal switch HR also has a single, three lead coil. This switch is operated to its actuated, or set, condition when current flows through one portion of its coil. It remains in its actuated condition thereafter notwithstanding the current flow through that portion of its coil ceases until current flows through the other portion of its coil. Upon the latter occurrence the switch is operated to its unactuated, or reset, condition. Hall call stop switch HS has two, two lead coils. It is operated to its actuated condition upon current flowing through one of its coils and remains in that condition as long as current is flowing in either of its coils. Upon the cessation of current through both coils it operates to its unactuated condition. Pawl magnet switch PM also has two two lead coils. It is operated to its actuated, or set, condition by current flowing through one of its coils. It remains in that condition notwithstanding current ceases in the one coil until current flows through its other coil. This operates the coil to its unactuated, or reset, condition.

In general, for purposes of simplification, only the coil circuits of the switches which perform functions individual to one elevator car and of the switches which perform group functions are illustrated. However, where confusion was thought possible the coil circuits of the other three cars are also illustrated. Where considered necessary differentiation between the respective cars and their individual equipment is provided in the following description and in the drawing by appending the lower case letters *a, b, c,* and *d,* a different one for each car, to the reference characters for the disclosed equipment. It is to be understood by those skilled in the art that where equipment individual to one car is disposed similar equipment is provided for each of the other three cars as well.

To facilitate describing the invention with sufficient particularity to enable anyone skilled in the art to practice it, it is disclosed in a system which is much more simplified than that which would be provided in a commercial installation, it being understood therefore that in applying the invention to control systems used commercially many modifications may be made.

In FIG. 1, elevator car 10 is suspended by hoist ropes 11 from sheave 12. Also suspended by the same ropes on the other side of sheave 12 is counterweight 13. Car 10 serves sixteen landings L1–LT as do all the cars in the group. In the system these landings are segregated into four zones including the main landing zone, and the first, second and third zones. To simplify the drawing, equipment associated with landings three, four, five, eight, nine, ten, thirteen, fourteen and fifteen has been eliminated. These are the intermediate landings of the first, second and third zones, respectively, and it will be apparent from the description and drawing how this equipment is connected into the system.

Sheave 12 is mounted on the shaft of armature MA of the direct current hoisting motor. Motor armature MA is connected acros sthe armature GA and series field GSEF of the direct current generator of a motor generator set (not otherwise shown) in the well known Ward Leonard arrangement. The shunt fields MF and GF of the hoisting motor and direct current generator, respectively, are both connected to receive current from a self-excited generator, commonly called an exciter. The armature EA of this exciter is rotated by rotation of the motor of the aforementioned motor generator set. The exciter has both a series field ESF and a shunt field EF.

The box marked S represents the typical safety circuits provided with an elevator.

Elevator car 10 moves whenever brake solenoid BR is energized to lift the elevator brake and motor armature MA enables sheave 12 to rotate.

Elevator car 10 is equipped with door operating means including a door motor having an armature DMA and a field DMF both connected to receive the output of exciter armature EA. The door operating means moves the elevator car door (not shown) and its associated hoistway door (not shown) at each landing between their opened and closed positions to enable passengers to transfer.

Also connected to receive the output of exciter armature EA is brush motor armature BMA and brush motor field BMF1 and BMF2 of a brush motor (not otherwise shown). The brush motor forms part of the typical elevator landing selector machine which includes both an advancer carriage (not shown) and a synchronous panel (not shown). The synchronous panel is driven by the movement of the elevator car to move in synchronism therewith past a plurality of positions corresponding to the landings. The advancer carriage is driven by the brush motor to move in the same direction as the synchronous panel but in advance thereof to scan the landings to select the next at which a stop is required. Movement of the advancer carriage in relation to the synchronous panel operates contacts SLS1–SLS4 to close whenever these two selector components are separated by more than various predetermined distances.

Door contacts DS represent the contacts of the hoistway door switches which are associated with the elevator car and are located at each landing. Gate contacts GS1 are the contacts of the car door switch of the elevator car. As is well known these hoistway and car door switches operate to close their respective contacts to enable the car to move when their associated doors are in their closed positions.

In FIG. 2 contacts GS2 are additional contacts of the car door switch which close when the car door moves a predetermined distance from its closed position toward its opened position. Door zone switch DZ is mounted on its car's landing selector and closes whenever its car is within a predetermined distance of a landing at which it is stopping.

Figures 3, 4:
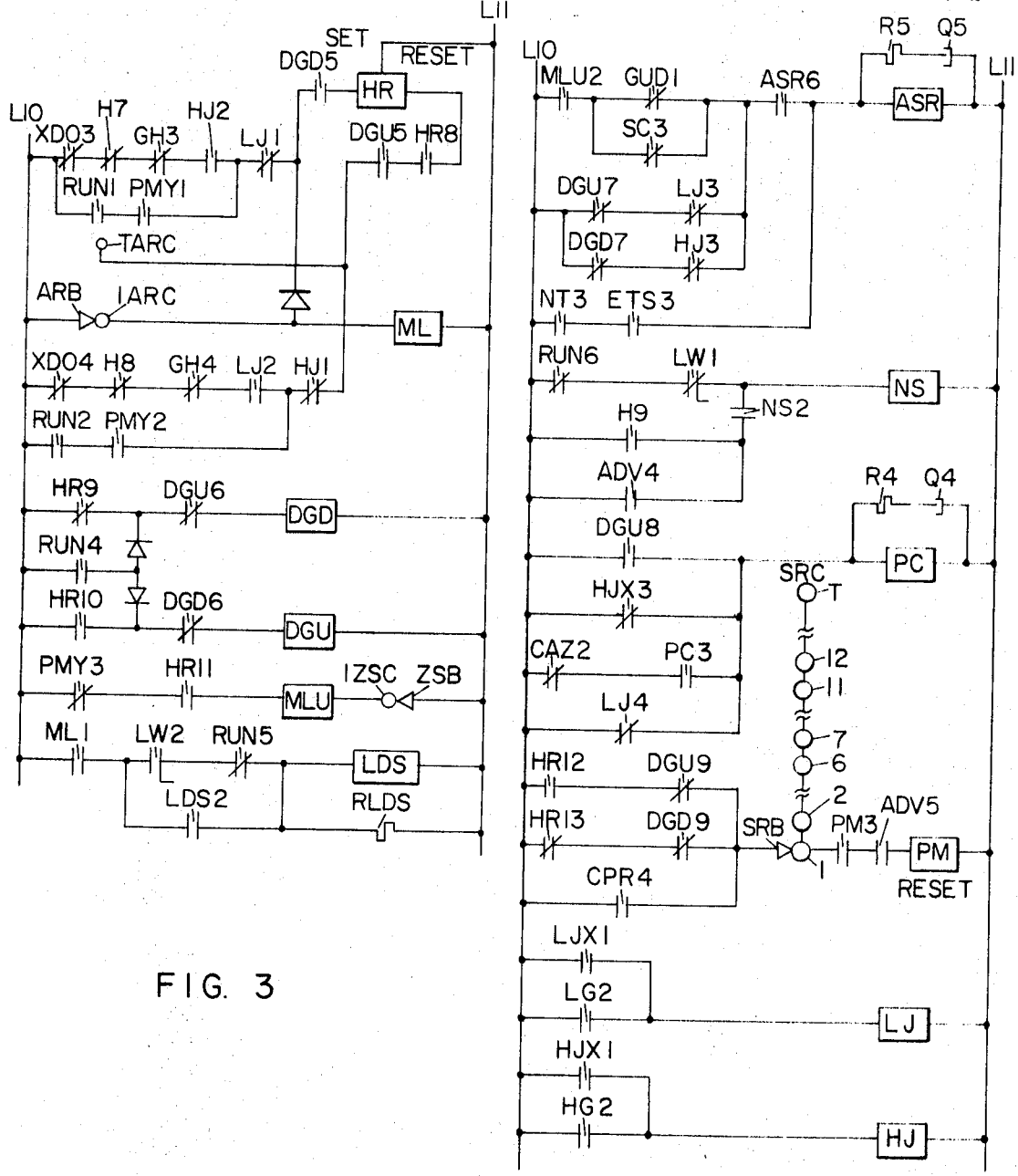

In FIG. 3 automatic reversal brush ARB is carried by the advancer carriage of its car's landing selector. It engages main and top landing automatic reversal contacts 1ARC and TARC to complete an electrical circuit when the advancer carriage approaches those positions corresponding to the main and top landings, respectively. Zoning selection brush ZSB is carried by the synchronous panel of its car's landing selector. It engages main landing zoning selection contact 1ZSC to make electrical connection therewith when its car approaches the main landing. Contacts LW2 are part of a load weighing switch (not shown) mounted on the car. As is typical, this switch operates to close these contacts when the car is carrying a predetermined portion of its rated load, say 60–80% thereof.

In FIG. 4 contacts LW1 are also part of the load weighing switch mounted on the car. These contacts are opened by this switch when the car is carrying a predetermined portion of its rated load, say 75–90% thereof. Selector rocking contact brush SRB is carried by the advancer carriage of its car's landing selector. It engages the cooperating selector rocking contacts 1SRC–TSRC to complete an electrical connection therewith when the advancer carriage approaches a position corresponding to the respective landings.

Figures 5, 6:
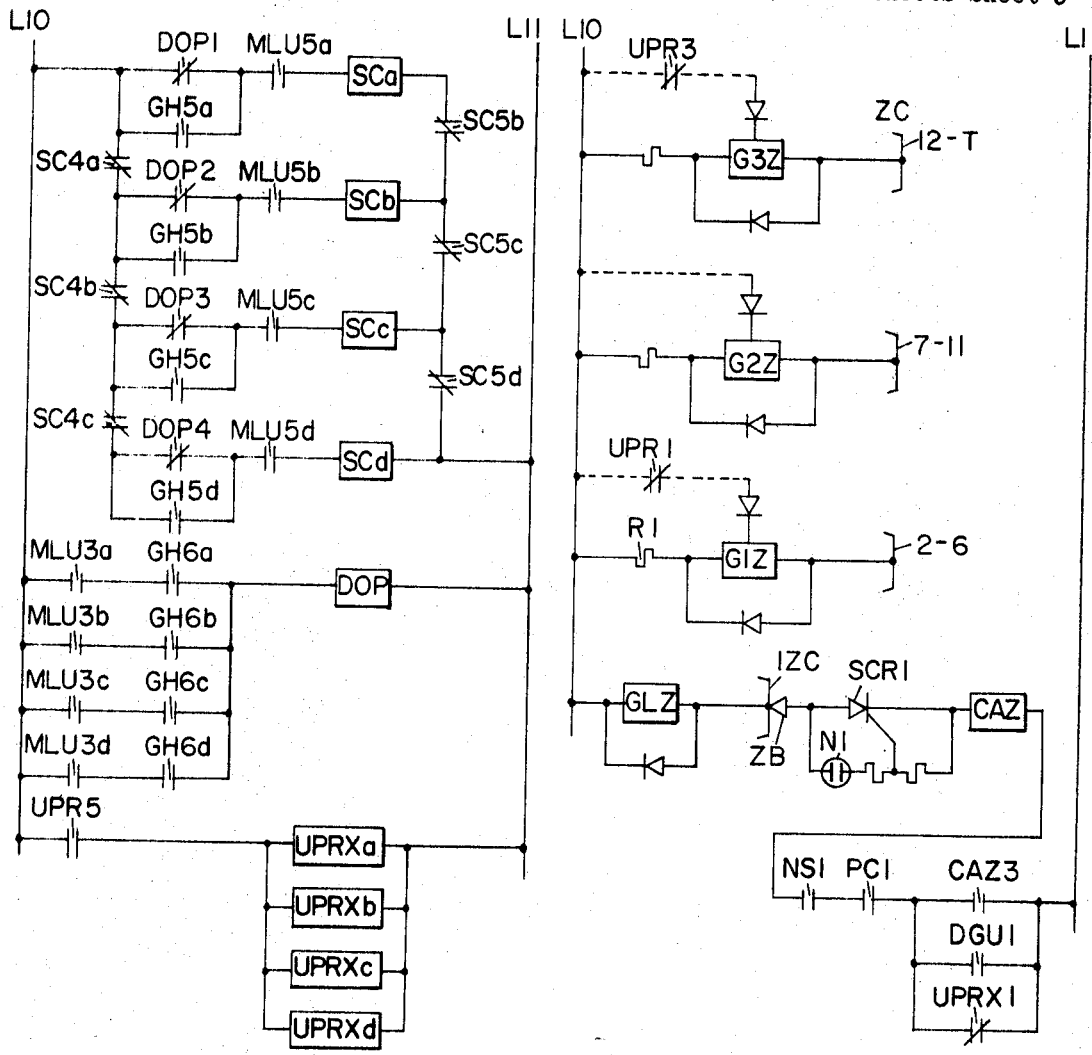
FIGS. 5, 6, 7 and 8 are schematic wiring diagrams in straight line form of control circuits for a four car elevator group including the car in FIG. 1; some of these circuits are individual to each car and others common to the group.

In FIG. 6 zoning brush ZB is carried on the advancer carriage of its respective car's landing selector. It engages zoning contacts ZC of the main landing, the first, second and third zones to complete an electrical connection therewith when its car's advancer carriage is located at a position corresponding to one of the landings in its respective zone; zoning contacts 1ZC, 2–6ZC, 7–11ZC and 12–TZC being long enough to span all positions corresponding to landings in their respective zones. The zoning contacts associated with each car for the four zones are interconnected so that the coils of zoning switches GLZ, G1Z, G2Z and G3Z are energizable in response to the location of any car in their respective zones. As should be understood from previous discussion and as indicated by the numerical designations of the zoning contacts, the main landing zone includes the main landing, the first zone landings 2 to 6, the second zone landing 7 to 11 and the third zone landings 12 to T.

Any zoning switch GLZ, G1Z, G2Z or G3Z is actuatable upon the zoning brush of any car engaging its zoning contact for the corresponding zone. For example with contacts UPR1 closed, the first car whose brush ZB engages its contact 2–6ZC causes the potential of line L10 to appear at brush ZB. This potential causes the associated neon tube N1 to conduct provided a circuit is established for it through closed contacts NS1, PC1 and DGU1 or UPRX1. Consequently a signal is applied to the gate of silicon controlled rectifier SCR1. As a result the rectifier conducts and enables sufficient current to flow through the coil of its associated car assignment switch CAZ and the coil of first zone switch G1Z to cause both switches to be actuated. Upon conduction of rectifier SCR1 associated with the first car to enter the first zone, the potential on the 2–6ZC contacts of all cars is reduced to a value sufficiently below that of line L10 to prevent the conduction of neon tube N1 of any other car which may enter the first zone while the first car to enter is still in that zone. This prevents the actuation of car assignment switch CAZ of any other car while a car remains in the first zone with its assignment switch operated.

If contacts UPR1 are opened the operation of the foregoing circuit is substantially similar except the insertion of resistor R1 and the resistance of the other part of the coil of first zone switch G1Z so limits the flow of current through silicon controlled rectifier SCR1 of even the first car to enter the zone that car assignment switch CAZ of that car is also prevented from being actuated. As a result neither that car's assignment switch nor the assignment switch of any other car in the first zone can be actuated.

Figure 7:
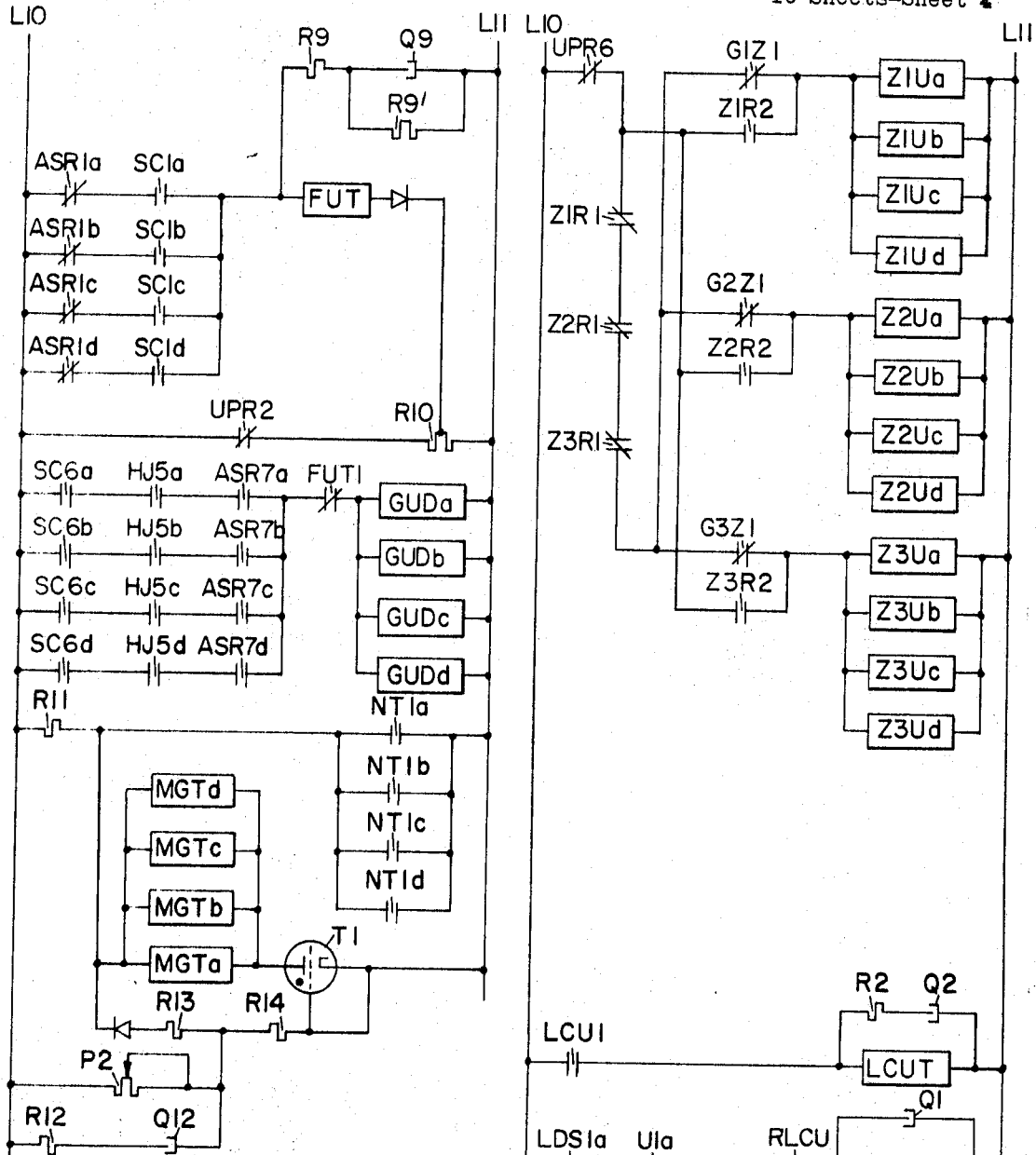

In FIG. 7 the coil of up dispatch timer switch FUT is energized to transfer the switch to its actuated condition whenever one of the four parallel circuits through the ARS1 and SC1 contacts of the four cars is completed. Switch FUT releases to its unactuated condition after all four of the parallel circuits are simultaneously interrupted for one or another predetermined period of time depending upon whether contacts UPR2 are opened or closed. When these contacts are closed a first predetermined period has to elapse before switch FUT releases and when these contacts are opened the period is increased.

Each motor generator time switch MGT$a$, MGT$b$, MGT$c$ and MGT$d$ is maintained in its unactuated condition, whenever one of the four parallel circuits through contacts NT1 of one of the four cars is completed. Upon all four of these parallel circuits being interrupted simultaneously for a predetermined period thyratron tube T1 conducts to energize the coil of each motor generator time switch MGT$a$, MGT$b$, MGT$c$ and MGT$d$ to transfer each to its actuated condition.

Figure 8:
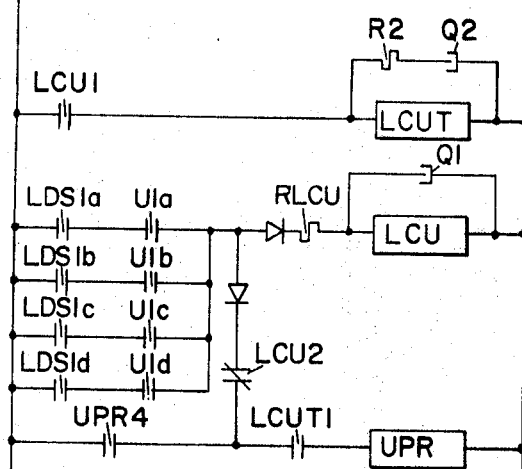

In FIG. 8 loaded car up switch LCU operates to its actuated condition a predetermined period after one of the four parallel circuits through the LDS1 and U1 contacts of one of the four cars is completed. This switch is released to its unactuated condition upon all four parallel circuits being simultaneously interrupted for the predetermined period of time provided by condenser Q1. When loaded car up switch LCU is actuated contacts LCU1 close and contacts LCU2 open. The closing of contacts LCU1 completes a circuit for the coil of loaded car up timing switch LCUT and that switch operates to its actuated condition. In opening, contacts LCU2 interrupt the energizing circuit for the coil of up traffic switch UPR.

Loaded car up timing switch LCUT releases to its unactuated condition after contacts LCU1 are open for the predetermined period provided by the circuit of resistor R2 and condenser Q2. If at any time between the release of switch LCU and the release of switch LCUT another one of the parallel circuits is completed through the LDS1 and U1 contacts of the four cars, up traffic switch UPR is operated to its actuated condition. Since switch LCU operates to its actuated condition a predetermined period after its coil circuit is completed, the energizing circuit for the coil of switch UPR under these circumstances is provided through the closed LDS1 and U1 contacts of the other car and closed contacts LCU2 and LCUT1. Switch UPR becomes self-holding through its own contacts UPR4 and contacts LCUT1 to remain operated upon contacts LCU2 opening. It releases to its unactuated condition whenever the predetermined period for the release of loaded car up timing switch LCUT elapses without another car completing one of the four parallel circuits through the LDS1 and U1 contacts.

Figure 9:
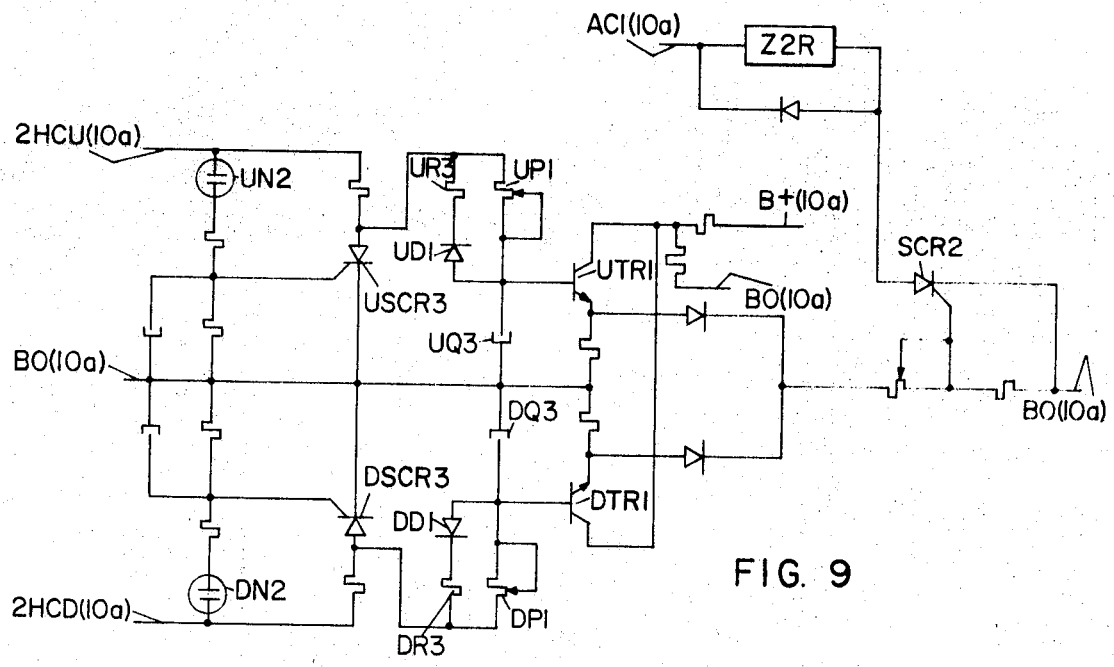
FIG. 9 is a schematic wiring diagram of a traffic measuring means employed with the four car group system disclosed herein.

FIG. 9 contains the schematic diagram of the traffic measuring means for the second zone including the coil circuit of the second zone heavy traffic switch. Similar traffic measuring means (not shown) are provided for each of the other zones in the system other than the main landing zone. Line 2HCU is connected to each of the up landing call registering devices for the second zone and line 2HCD to each of the down landing call registering devices for the second zone. Similarly, the traffic measuring means for the other zones are also connected to the up and down landing call registering devices for their respective zones. Both the up and the down landing call registering devices are illustrated in FIG. 10$a$ and will be discussed in more detail in conjunction with the description of that figure.

In operation, any up landing call in registration in the second zone causes the production of a signal along line 2HCU. This signal charges condenser UQ3 through potentiometer UP1. This charge is applied to the base of transistor UTR1 which operates as an emitter follower conducting current through its collector-emitter circuit from the positive potential on line B+ (+135 volts with respect to line BO, being preferred) to line BO. As a result the potential of the emitter increases as the charge on condenser UQ3 increases. When a sufficient enough charge accumulates, a signal of sufficient magnitude is applied from the emitter of transistor UTR1 to the gate of silicon controlled rectifier SCR2 to enable it to conduct. As a result current flows during positive half cycles of the A.C. potential on line AC1 (95 volts R.M.S. with respect to line BO, being preferred) through the coil of second zone heavy traffic switch Z2R and the anode-cathode circuit of retcifier SCR2 to line BO. This current is sufficient to operate switch Z2R to its actuated condition.

When an up landing call in the second zone is cancelled the cancellation signal is transmitted along line 2HCU and causes neon tube UN2 to conduct. This applies a signal of sufficient magnitude to the gate of silicon controlled rectifier USCR3 to cause it to conduct and provide a low resistance path for the discharge of condenser UQ3 through UD1, resistor UR3 and rectifier USCR3 to line BO. If rectifier SCR2 is not conducting, this discharge merely re-establishes the period during which condenser UQ3 must charge for the rectifier to start conducting. If, however, when this discharge occurs, rectifier SCR2 is conducting, not only is the period for UQ3 re-established but the decrease in potential at the base of transistor UTR1 following the discharge causes a corresponding decrease in potential at the emitter. This reduces the signal at the gate of rectifier SCR2 sufficiently to cause it during the following negative half cycle of the A.C. potential on line AC1 to cease conducting until a signal of sufficient magnitude is again applied to its gate. As a result, second zone heavy traffic switch Z2R releases to its unactuated condition.

Except for rectifier SCR2 and the coil of switch Z2R the rest of the circuitry of FIG. 9 is symmetrical about line BO. In view of this it should be evident that the bottom half of this circuitry operates in response to down landing calls registered in the second zone similarly to the described manner in which the top half operates in response to up landing calls registered in that zone.

In FIG. 10a the well known cold cathode gas tube touch button type up and down landing, or hall, call registering devices are illustrated. Only those devices and the cooperating circuitry therefor which are provided for the main landing and the terminal landings for the other zones are shown. The devices and circuits not shown are connected, in a fashion similar to those shown, between the appropriate broken line designations.

Preferably the potentials supplied to these circuits are +135 volts from line B+ to line BO, 95 volts R.M.S. from line AC1 to line BO and 150 volts R.M.S. from line BO to the grounded side of the secondary of transformer TF. In addition the potential between lines AC1 and BO and that between line BO and ground preferably are 180° out of phase with each other.

An individual up landing call stop contact UH, down landing call stop contact DH, high landing call reversing contact HH and low landing call reversing contact LH is provided for each landing for each of the four cars in the system, corresponding contacts for the same landing being interconnected between all four cars. In this way each of the four cars can be capable of responding to any landing, or hall, call. The contacts that are associated with a car and correspond to a particular landing are mounted on that car's landing selector and are located on the selector at the position corresponding to the landing for which they are provided.

All landing, or hall, call tubes represented by tubes 1U–12U and 2D–TD are RCA type 1C21. Each is arranged so as to break down and conduct current from line B+ to line BO in response to a person touching the button (TB on 6U) connected to its glass envelope. This registers the corresponding landing, or hall, call and produces a voltage across the associated load resistor RUL or RDL which is applied to the corresponding landing selector contact UH or DH of each car, to enable a car to stop for the call. This voltage is also applied to various HH and LH contacts, as appropriate, through the respective diode chain circuits to enable cars to determine whether the call is above or below their location. In addition the voltage is applied through an individual series connected diode and resistor circuit along the associated line 1HCU, 1HCD, 2HCU, 2HCD, 3HCU or 3HCD. Lines 1HCU, 2HCU and 3HCU are connected to the series diode and resistor circuit of each up landing, or hall, call registering device in the first, second and third, zones, respectively and lines 1HCD, 2HCD and 3HCD are connected to the series diode and resistor circuit of each down landing, or hall, call registering device in the first, second and third zones, respectively. Lines 2HCU and 2HCD are connected to the traffic measuring means for the second zone, shown in FIG. 9. In the same way, lines 1HCU–1HCD and 3HCU–3HCD are respectively connected to the traffic measuring means for the first and third zones (not shown).

In FIG. 10b an individual up landing call stop brush UHB, down landing call stop brush DHB, high landing call reversing brush HHB and switch HHS and low landing call reversing brush LHB and switch LHS are provided for each of the four cars. These brushes are mounted on the advancer carriage of their respective car's landing selector and engage their cooperating contacts for a landing when the advancer carriage is located at the position corresponding to that landing.

Depending upon the direction of travel established hall call stop switch HS for a particular car is operated whenever brush UHB or DHB engages an up landing call contact UH or a down landing call contact DH whose associated touch button tube is conducting. In these circumstances, the engaged contact is at the potential established by the voltage drop across the associated load resistor RUL or RDL. This potential is applied through a circuit including closed contacts HR1 or HR2 to the gate of silicon controlled rectifier SCR4. During the succeeding positive half wave of the signal along line AC1, rectifier SCR4 conducts and provides energizing current for the coil of hall call stop switch HS. This operates switch HS to its actuated condition closing contacts HS1 and applying the positive half wave potential of line AC1 minus the voltage drop across the anode cathode circuit of rectifier SCR4 to the cathode of the landing, or hall, call touch button tube which initiated the actuation of switch HS. As a result the potential of the cathode of this call tube is raised sufficiently with respect to line B+ to lower the voltage across the anode cathode circuit of the tube to below its sustaining value. This extinguishes the tube, cancelling the call registration, and removing the potential from its associated up or down landing call contact UH or DH. In these circumstances, during the succeeding negative half wave of the potential along line AC1 rectifier SCR4 is turned off and remains off until it once again receives a triggering signal on its gate.

High and low landing call reversing switches HHS and LHS are electrically insulated from their respective brushes HHB and LHB. Each switch is mechanically operated by its associated brush to open just after the brush engages one of its cooperating contacts HH or LH and to close just before the brush disengages one of its cooperating contacts. Hall call above switch HJX is operated whenever its associated brush HHB engages a cooperating HH contact which has applied to it the potential across a load resistor RUL or RDL resulting from the registration of a hall call indicating a desire to travel above the landing whose contact, brush HHB is engaging. When this happens, this potential is applied to the gate of silicon controlled rectifier SCR5 causing it to conduct during positive half cycles of the signal along line AC1. This operates hall call above switch HJX to its actuated condition in which it is maintained until brush HHB engages an HH contact which does not have a load resistor potential applied to it. Upon the engagement of such a contact the signal is removed from the gate of rectifier SCR5 which turns off and remains off until its gate signal is restored. Switch HHS maintains a circuit for the coil of switch HJX during the times when brush HHB disengages the HH contact for one landing and before it engages the HH contact for the succeeding landing in the direction of car travel.

Hall call below switch LJX and its connected circuitry and equipment operates in a manner similar to that of switch HJX except that whereas switch HJX operates whenever brush HHB engages an HH contact which is at a potential signifying the registration of a hall call indicating a desire to travel above the landing whose HH contact, brush HHB is engaging; switch LJX operates whenever brush LHB engages an LH contact which is at a potential signifying the registration of a hall call indicating a desire to travel below the landing whose LH contact, brush LHB is engaging.

In FIG. 11 the cold cathode gas tube touch button type car call registering devices illustrated are similar in structure and operation to the landing, or hall, call registering devices of FIG. 10a. Also car call stop switch CBS and its associated silicon controlled rectifier SCR7 operates in response to the engagement of car call stop brush CAB with a car call stop contact CAC associated with a landing for which a car call is registered in a manner similar to that in which hall call stop switch HS and its associated rectifier SCR4 (FIG. 10b) operates. And car call above switch HG and car call below switch LG operates in response to the registration of car calls indicating a desire to travel up or down in a manner similar to that in which hall call above switch HJX and hall call below switch LJX operates.

High car call reversing brush HCB is mounted on the advancer carriage of its associated car's landing selector and comprises two mechanically joined but electrically separated portions. The upper portion is an electrically insulated brush which opens the high car call switch HCC for a particular landing upon engaging it, such engagement occurring when the advancer carriage is located at the position corresponding to that landing. The lower portion also acts to open the contacts of a high car call switch HCC upon engaging it, however it is a conductor and as illustrated maintains a circuit with one of the contacts of the switch. Brush HCB is arranged so that when its upper portion is engaging the high car call switch for a particular landing, its lower portion is engaging the high car call switch for the landing below that particular landing.

The "spindle sheet" diagrams of FIGS. 12, 13 and 14 facilitate the location on the other figures of the drawing of the coil or any contacts of any of the switches. The numerals in parentheses next to the coil and contact designations on the spindle sheets identify the figure of the drawing upon which an associated coil or pair of contacts appear. The reference characters along the tops of the "spindle sheets" refer to the various switches employed in the system. By placing the spindle sheet containing the switch whose coil or contact pair location is of interest in alignment with the figure identified in parentheses on the spindle sheet, the desired location of the particular coil or contact pair will be found in the identified figure at the same vertical position as that occupied on the spindle sheet by that particular coil or contact pair.

Numerals in parentheses next to some of the reference characters for connection lines on some of the figures of the drawing identify those figures on which the continuations of such lines will be found.

All switches in the drawing are illustrated in their unactuated condition. The contact pairs of the switches, consequently, are in their opposite state upon their respective switches being operated to their actuated condition.

All selector brushes are illustrated in those positions in which they would be located if their respective car were located at the main landing.

In view of the fact that the basic operation of the presently disclosed zoned elevator control system is known per se to those skilled in the art, it is considered unnecessary to disclose it in detail herein. Simplified circuitry which provides this basic operation is shown in the drawing and no one skilled in the art could have any difficulty in understanding how this circuitry functions.

Briefly, as explained in connection with FIG. 6, the first car entering an unoccupied zone has its assignment switch CAZ (FIG. 6) actuated. Simultaneously, the zone switch for that zone is also actuated. No other car thereafter entering the zone can have its assignment switch actuated while it is in that zone as long as the first entering car remains in that zone with its assignment switch actuated. These other cars are caused to leave the zone and travel to an unoccupied zone whose zone switch consequently is in its unactuated condition. An unactuated zone switch for the first, second or third zone G1Z, G2Z or G3Z (FIG. 6) causes the actuation of its associated zone call switch Z1U, Z2U or Z3U (FIG. 8) for each car. The circuits for the coils of these switches are completed through contacts UPR6, Z1R1, Z2R1 and Z3R1 and contacts G1Z1, G2Z1 and G3Z1 of the respective zone switches. Actuation of the zone call switch Z1U, Z2U or Z3U closes contacts Z1U1, Z2U1 or Z3U1 (FIG. 11) for each car. In each unassigned car this completes a circuit for each unoccupied zone which applies a signal similar to that applied by the registration of a car call in the car for one of the landings in such zones. The circuits producing these signals are completed through contacts PC2, CAZ1 and Z3U1 or contacts PC2, CAZ1, Z2U1 and HR3 or HR4 or contacts PC2, CAZ1, Z1U and HR5 or HR6. Contacts HR3, HR4, HR5 and HR6 complete a circuit to either the top or bottom landing in the second and first zones depending upon whether unassigned cars travel down or up to such zones.

If the first, second and third zones are all occupied an unassigned car travels to the main landing because a signal similar to that produced in response to the registration of a car call for that landing is applied through contacts PC2, CAZ1 and HG1. When an unassigned car arrives at an unoccupied zone its assignment switch CAZ and the zone switch GLZ, G1Z, G2Z or G3Z for that zone are actuated in the manner previously described. Actuation of assignment switch CAZ opens contacts CAZ1 and interrupts all circuits applying signals similar to a car call.

Upon the actuation of its assignment switch a car operates in the zone in which it is assigned responding to all landing calls therein, reversing at both the highest and lowest calls registered therein provided, one, that the car is not capable of responding to landing calls outside that zone and, two, that no car call is registered in it causing it to leave the zone.

Reversal from the up to the down direction of travel takes place both at the landing for which the highest car call is registered if there is no landing call registered at a higher landing to which the car can respond, and at the landing for which the highest down landing call is registered if there is neither a car call nor an up landing call registered at a higher landing to which the car can respond. As the advancer carriage approaches the position corresponding to the landing for which such a highest car call or such a highest down landing call is registered, call above switch HJ (FIG. 4) is released because either high car call reversing brush HCB (FIG. 11) opens the high car call switch HCC for that landing releasing car call above switch HG or high landing call reversing brush HHB (FIG. 10b) engages the unenergized HH contact (FIG. 10a) for that landing releasing hall call above switch HJX. This closes contacts HJ1 (FIG. 3). During this time, running switch RUN (FIG. 2) and auxiliary pawl magnet switch PMY (FIG. 2) are actuated and contacts RUN1 and PMY1 (FIG. 3) are also closed. In addition, since the car is traveling up, up direction switch DGU (FIG. 3) and reversal switch HR (FIG. 3) are also actuated closing contacts DGU2 and HR7 (FIG. 3). As a result when contacts HJ1 close a circuit for the reset coil of reversal switch HR is completed and the switch is transferred to its unactuated condition.

Reversal from the down to the up direction of travel takes place both at the landing for which the lowest car call is registered if there is no landing call registered at a lower landing to which the car can respond, and at the landing for which the lowest up landing call is registered if there is neither a car call nor a landing call registered at a lower landing to which the car can respond. This reversal is accomplished, in a manner similar to the foregoing reversal to the down direction of travel, in response to the release to the unactuated condition of call below switch LJ (FIG. 4) and the subsequent closing of contacts LJ1 (FIG. 3).

Actuation of a zone switch for the first, second or third zone G1Z, G2Z or G3Z limits the response to landing calls registered in its respective zone to a car located therein. Thus the actuation of second zone switch G2Z in response to the occupation of the second zone by one of the cars causes contacts G2Z3 (FIG. 10a) to disengage. This prevents a landing, or hall, call registered at one of the landings in the second zone, which includes landings 7 to 11, from energizing the coil of hall call above switch HJX (FIG. 10b) of any car below the seventh landing. As a result no such car can respond to any landing call registered in the second zone. Cars above the second zone are prevented from responding to landing calls registered therein because the series diode circuit interconecting the low landing call contacts LH (FIG. 10a) is permanently interrupted between the twelfth and eleventh landings. This prevents a landing, or hall, call registered at any of the landings in the second zone from energizing the coil of hall call below switch LJX (FIG. 10b) of any car above the eleventh landing. In similar fashion, each of the other zones is isolated from its adjacent zones to limit the response to landing calls.

With the preceding background information in mind, assume the cars are distributed with one occupying each of the four zones. Each has its assignment switch CAZ actuated and each of the zone switches GLZ, G1Z, G2Z and G3Z is similarly actuated. Assume also that the car in the second zone, car a, is traveling down therein in response to car calls registered in it for landings below its location. In these circumstances, down direction switch DGDa (FIG. 3) is actuated to open contacts DGD6a (FIG. 3) and prevent the actuation of up direction switch DGUa (FIG. 3). Also car call below switch LGa (FIG. 11) is actuated to close contacts LG2a (FIG. 4) and actuate call below switch LJa (FIG. 4).

As a result, contacts CAZ2a, DGU8a and LJ4a are all open in the coil circuit of passed call switch PCa (FIG. 4). This switch is actuated, however, its coil being energized through the circuit including contacts HJX3a. Assume now that a landing call is registered at one of the landing call registered in the second zone to be applied ing to the position at which high landing call reversing brush HHBa (FIG. 10b) is located. Thus brush HHBa is contacting a high landing call reversing contact HHa (FIG. 10a) which is energized to the potential developed across a load resistor RUL or RDL (FIG. 10a) in response to the conduction of one of the touch button tubes associated with landings 7 to 11. This potential is applied to the gate of rectifier SCR5a (FIG. 10b) causing that rectifier to conduct during positive half cycles of the A.C. potential along lines AC1. This actuates hall call above switch HJXa (FIG. 10b) which opens contacts HJX3a. In response, passed call switch PCa releases after the slight time delay provided by resistor R4a and condenser Q4a. This opens contacts PC1a (FIG. 6) which interrupts the circuit for the coils of car assignment switch CAZa and second zone switch G2Z (FIG. 6). Second zone switch G2Z releases closing contacts G2Z3 (FIG. 10a) enabling the load resistor potential developed as a result of the landing call regitsered in the second zone to be applied to each car's high landing call reversing contacts HH associated with the landings in the first zone. This causes the actuation of the hall call above switch HJX of the car in the first zone, say car b, enabling it to respond to the landing call in the second zone above car a.

To understand how car b is so enabled, assume that it is stopped at a landing in the first zone with its doors closed prepared for future down travel and that there is no demand for its service in existence other than the landing call in the second zone. Thus auxiliary door control switch XDOb (FIG. 2) field and brake switch Hb (FIG. 1), door open switch GH (FIG. 2), lower call switch LJ (FIG. 4) and reversal switch HRb (FIG. 3) are all in their unactuated conditions, while down direction switch DGDb is in its actuated condition. As a result, when hall call above switch HJXb (FIG. 10b) is actuated, it closes its contacts HJX1b (FIG. 4) which actuates call above switch HJb (FIG. 4). This closes contacts HJ1b (FIG. 3) and completes a circuit for the set coil of reversal switch HRb through closed contacts XDO4b, H8b, GH4b, LJ2b, HJ1b and DGD5b. In response switch HR operates to its actuated condition to open contacts HR9b (FIG. 3) and release down direction switch DGDb and to close contacts HR10b (FIG. 3) and actuate up direction switch DGUb. This opens contacts DGU7b (FIG. 4) to interrupt the only completed circuit for the coil of automatic start switch ASRb which thereupon releases after the time delay provided by resistor R5 and condenser Q5. Upon the release of this switch car b starts to move in the up direction in response to the landing call in the second zone.

When zoning brush ZBb of car b engages zoning contact 7–11 ZCb for the second zone, car assignment switch CAZb and second zone switch G2Z (FIG. 6) are both actuated in the manner previously described. The actuation of switch G2Z once again prevents cars below the second zone from responding to landing calls registered at landings in that zone.

As car b enters the second zone its zoning brush ZBb disengages zoning contact 2–6 ZCb for the first zone releasing first zone switch G1Z (FIG. 6). Ths closes contacts G1Z1 (FIG. 8) to energize the coils of each car's zone call switch Z1U through closed contacts UPR6, Z1R1, Z2R1, Z3R1 and G1Z1. This actuates each of these switches to close their respective contacts Z1U1 (FIG. 11) to enable each car whose assignment switch CAZ is unactuated to travel to the first zone for assignment thereto in the manner previously described.

Assume now that car b stops in response to the landing call in the second zone before car a answers its last car call. In stopping for this call it cancels it in the manner described in connection with FIG. 10b and removes the potential developed across the associated load resistor RUL or RDL. This not only causes the release of hall call above switch HJXb of car b but also causes the release of hall call above switch HJXa of car a upon the subsequent engagement of high landing call reversing brush HHBa with one of its cooperating contacts HHa. As a result, contacts HJX3a (FIG. 4) close to actuate passed call switch PCa. This closes contacts PC2a (FIG. 11) to apply a signal through those contacts and closed contacts CAZ1a, Z1U1a and HR6a to high car call switch HCC6a to cause car a to travel down to the first zone upon answering its last car call.

Assume now that before car a answers its last call a predetermined level of traffic is encountered in the third zone as indicated by the elapse of a predetermined period, say ninety seconds, during which an up landing call continues in registration at one of the landings in the third zone without any up landing call being cancelled in that zone. In the manner explained in connection with the traffic measuring means for the second zone (FIG. 9), this causes the traffic measuring means for the third zone (not shown) to operate to actuate the third zone heavy traffic switch Z3R (coil not shown). In response contacts Z3R2 (FIG. 8) close to energize the coils of the third zone call switches Z3Ua, etc. through closed contacts UPR6. In addition, contacts Z3R1 open to interrupt the circuit for the coils of the first zone call switches Z1Ua, etc. releasing them to their unactuated condition. As a result, the signal applied to high car call switch HCC6a of car a ceases and car a is prevented from traveling down to the unoccupied first zone as it otherwise would in response to the unactuation of the first zone switch G1Z. Rather in preference thereto the energization of the coil of third zone call switch Z3Ua actuates that switch to close contact Z3U1a (FIG. 11) to apply a signal to high car call switch HCC12a through closed contacts PC2a and CAZ1a, and this causes car a to travel up toward the top zone upon answering its last car call.

Furthermore, notwithstanding that during this time car c may be occupying the third zone and the actuation of third zone switch G3Z (FIG. 6) with its consequent separation of contacts G3Z2 (FIG. 10a) would otherwise prevent cars below that zone from responding to landing calls registered therein, when the third zone heavy traffic switch Z3R is actuated it closes contacts Z3R4 (FIG. 10a) to enable any car located in the next occupied zone below to so respond. Thus under the assumed conditions cars a and b both being located in the second zone are enabled by the actuation of the third zone heavy traffic switch Z3R to respond to landing calls registered in the third zone notwithstanding that zone is occupied and its zone switch G3Z is actuated.

Upon the cancellation of an up landing call in the third zone, third zone heavy traffic switch Z3R is restored to its unactuated condition in the manner explained with respect to second zone heavy traffic switch Z2R and the system is restored to the manner of operation preceding the actuation of switch Z3R.

It should be understood that if a heavy traffic condition is encountered in either the first or second zone and no car is below that zone to respond thereto, a car above the heavy traffic zone is enabled to so respond. Thus assume second zone heavy traffic switch Z2R (FIG. 9) is actuated. If when this occurs both the main landing zone and the first zone are unoccupied, main landing zone switch GLZ and first zone switch G1Z (FIG. 6) are both unactuated. As a result, contacts GLZ1, G1Z2 and G1Z4 (FIG. 10a) are all closed to complete a circuit through also closed contacts Z2R4 to low landing call contact LH12 of each of the cars. This applies a signal to each of the cars in the third zone which actuates their respective hall call below switches LJXa, etc. (FIG. 10b) to cause them to travel down to the second zone to enable them to respond to landing calls registered therein.

It should also be understood that when a heavy traffic condition is encountered in any of the zones above the main landing a car whose assignment switch is not actuated is prevented from traveling down to the main landing as it otherwise would if all the zones above that landing are occupied. In the presence of the occupation of all zones above the main landing, a car whose assignment switch CAZ is unactuated is caused to travel down to the main landing in response to the signal applied to its high car calls switch HCC1 (FIG. 11) through closed contacts PC2, CAZ1 and HG1. When a heavy traffic condition arises in one of the upper zones, say the second zone, contacts Z2U1 (FIG. 11) are closed to apply a signal in each car to respective high car call contact HCC7 or HCC11. If when this happens the car whose assignment switch is unactuated is below the second zone the signal applied through contacts Z2U1 causes the actuation of high car call switch HG (FIG. 11). This opens contacts HG1 (FIG. 11) and interrupts the circuit through which the signal which causes the car to travel to the main landing is applied. If the car is above the second zone, high car call switch HG is actuated by the signal applied to switch HCC11 through contacts Z2U1 and HR3 to interrupt the circuit for the signal to switch HCC1 when the car passes the eleventh landing while traveling down. If the car is in the second zone, switch HG is actuated immediately by the signal applied to switch HCC11 if the car is traveling down, when the heavy traffic condition arises whereas if it is traveling up at the time switch HG is actuated only after the car reverses and starts to travel down.

In order to understand the operation of the system under conditions of predominant up traffic in which predominantly all the passengers are up travelers who enter a car at the main landing, assume cars a and c are stopped at landings in the first and third zones, respectively, both have their doors closed and there is no further demand for service for either. These cars have their assignment switches CAZa and CAZc actuated and both the first and the third zone switches G1Z and G3Z are actuated. Also assume that car b is approaching the main landing to stop in response to a car call. While car b is traveling down, field and brake switch Hb (FIG. 1) is actuated to close contacts H5b (FIG. 2) and actuate door open time switch NTb. Contacts NT2b (FIG. 2) are closed to actuate auxiliary door control switch XDOb. When car call stop brush CABb (FIG. 11) engages car call stop contact CAC1b, car call stop switch CBSb is actuated in response to the potential developed across load resistor RCL1b as a result of the conduction of the main landing car button tube 1Cb in car b. This closes contacts CBS1b (FIG. 2) and enables the energization of the coil of call stop switch CPRb through those contacts and closed contacts XDO6b. Switch CPRb is actuated and becomes self-holding through its own contacts CPR2b. In addition it closes contacts CPR4b (FIG. 4) to energize the reset coil of pawl magnet switch PM through engaged selector rocking contact SRC1b and brush SRBb and closed contacts PM3b and ADV5b. As a result, switch PMb operates to its unactuated condition opening its contacts PM1b, PM2b and PM3b initiating the slowdown and stopping of car b and the release of auxiliary pawl magnet switch PMYb to its unactuated condition.

Approximately simultaneously with the operation of pawl magnet switch PMb, automatic reversing brush ARBb (FIG. 3) is engaging main landing automatic reversing contact 1ARCb causing the energization of the set coil of reversing switch HRb through closed contacts DGD5b. This actuates switch HRb to close contacts HR11b (FIG. 3) and complete a circuit for the coil of main landing up switch MLUb through those contacts, closed contact PMY3b and engaged main landing zoning selection contact 1ZSCb and brush ZSBb. The resulting actuation of main landing up switch MLUb closes contacts MLU5b (FIG. 5) and completes a circuit for the coil of selected car switch SCb through closed contacts SC4a, DOP2, SC5c and SC5d. As a result switch SCb is actuated and car b is selected as the next car to leave the main landing.

In addition to the foregoing, also assume that car d has just left the main landing traveling up and carrying more than 60% of its rated load which is enough to close contacts LW2d (FIG. 3) of its load weighing switch. Thus, while it was still located at the main landing and main landing switch MLd (FIG. 3) was actuated as a result of the completed circuit through main landing automatic reversal contact 1ARCd and brush ARBd, load dispatch switch LDSd (FIG. 3) was actuated through closed contacts ML1d, LW2d and RUN5d. This means that when car d started in the up direction closed contacts LDS1d and U1d caused the actuation of loaded car up switch LCU (FIG. 8). Contacts LCU1 (FIG. 8) thereupon closed to actuate loaded car up timing switch LCUT which closed its contacts LCUT1 (FIG. 8) in the circuit of the coil of up traffic switch UPR. Continued motion of car d in the up direction separated automatic reversal brush ARBd (FIG. 3) from contact 1ARCd and released main landing switch MLd. This opened contacts ML1d (FIG. 3) releasing load dispatch switch LDSd. The consequent opening of contacts LDSd (FIG. 8) released loaded up car switch LCU which thereupon opened its contacts LCU1 (FIG. 8). However, loaded up car timing switch LCUT is maintained actuated by the time delay provided by resistor R2 and condenser Q2. This maintains contacts LCUT1 closed in the circuit of the coil of up traffic switch UPR for the time delay, say two minutes.

Now assume that within this period car $b$, the selected car at the main landing, is also caused to leave that landing in the up direction and carrying more than 60% of its rated load. This causes the actuation of load dispatch switch LDSb (FIG. 3) in the same manner that switch LDSd was actuated. This closes contacts LDS1b (FIG. 8) so that when car $b$ starts traveling up the engagement of contacts U1b (FIG. 8) causes the energization of the coil of up traffic switch UPR through closed contacts LCUT1 and LCU2 (switch LCU being slightly delayed in operating). This signifies a predominantly up traffic condition and actuates switch UPR which closes contacts UPR4 to establish a self-holding circuit. Contacts UPR6 (FIG. 8) open to prevent the actuation of any zone call switch Z1Ua, etc., Z2Ua, etc. or Z3Ua, etc. in response either to the operation of a zone switch or a heavy traffic switch for any zone. Thus under predominantly up traffic conditions no car is caused to travel to the first, or the second or the third zone either because the zone is unoccupied or because a heavy demand arises therein. Contacts UPR5 (FIG. 5) close to cause the actuation of auxiliary up traffic switches UPRXa, etc. This opens contacts UPRX1 (FIG. 6) of each car preventing the actuation of assignment switch CAZ (FIG. 6) of any down traveling car (contacts DGU1, FIG. 6, open) whose assignment switch is not already actuated (contacts CAZ3 closed). In addition this prevents the actuation of any zone switch G1Z, G2Z or G3Z by any down traveling car whose assignment switch is not actuated.

Contacts UPR1 and UPR3 (FIG. 6) both open to prevent the operation of car assignment switch CAZ of any car in the first and third zones as previously explained. As a result of this operation, the described operation of the circuit of contacts PC2, CAZ1 and HG1 (FIG. 11) is enabled and this in conjunction with the immediately precedingly explained operation concerning down traveling cars causes all cars entering the third zone during up traffic conditions to travel to the main landing. While present in the third zone, however, such cars do cause the actuation of third zone switch G3Z (FIG. 6) which as explained limits the response to landing calls registered in that zone to cars located therein.

Cars which enter the third zone during up traffic conditions are not the only ones caused to travel to the main landing. Since no car is caused to travel to any of the zones in response to either the unactuation of the zone switch for that zone or the actuation of the heavy demand switch for that zone, any up traveling car which is not responding to a call for a landing above one in the first zone reverses at the landing in the first zone for which the highest down landing or car call is registered. Since the assignment switch of a car in the first zone is prevented from being actuated during up traffic conditions a car reversing in the first zone under these conditions is also caused to travel to the main landing by virtue of the operation of the circuit of contacts PC2, CAZ1 and HG1 (FIG. 11). As with the third zone, any car occupying the first zone causes the actuation of first zone switch G1Z (FIG. 6) which limits the response to landing calls registered in that zone to cars located therein.

During up traffic conditions, the circuitry shown in FIG. 6 permits the actuation of the assignment switch of an up traveling car in the second zone if, as explained, no other car is present therein with its assignment switch actuated. Such a car is not caused to travel to the main landing since contacts CAZ1 (FIG. 11) are opened. It can remain in the second zone to respond to landing calls registered therein and in the third zone if unoccupied. Once it leaves the second zone, however, its assignment switch becomes unactuated and it too is caused to travel to the main landing. While present in the second zone though, it causes the actuation of second zone switch G2Z (FIG. 6) which limits the response to landing calls registered in that zone to cars located therein.

Cars which are caused to travel to the main landing during up traffic conditions are selected for dispatch therefrom by a non-sequential, non-rotational selection means. This includes a preference arrangement which causes the selection of a car with its doors open to one with its doors closed. The door operating means, including armature DMA of the door motor of any car is prevented from operating its associated car and hoistway door to their opened positions at the main landing unless call stop switch CPR of that car (FIG. 2) is actuated to close its contacts CPR1 (FIG. 2) to complete a circuit for the coil of door control switch DO of that car. (The other circuit for the coil of switch DO includes contacts GH2 which are only closed if the doors are already opened.) When a car is at or arriving at the main landing call stop switch CPR can only be actuated if its associated car is selected at that landing (contacts SC2 are closed) or if the car is cancelling a landing or car call (HS4 or CBS1 are closed) registered for that landing.

A car arriving at the main landing when no other car is present and selected thereat is immediately selected by the actuation of its selected car switch SC (FIG. 5). This occurs in the manner previously described for the actuation of selected car switch SCb of car $b$. The doors of such a car are opened. This takes place because contacts H5 (FIG. 2) of brake and field switch H are closed as the car is traveling down and until it comes to a stop. This energizes the coil of door open time switch NT which is actuated to close its contacts NT2 (FIG. 2) and NT3 (FIG. 4). Contacts NT2 cause the actuation of auxiliary door control switch XDO to close its contacts XDO2 (FIG. 2). This energizes the coil of excitation time switch ETS which is actuated to close its contacts ETS3 (FIG. 4). Closed contacts NT3 and ETS3 complete an energizing circuit for the coil of automatic start switch ASR, which is thereby actuated to close its contacts ASR5 (FIG. 2.) These contacts are maintained closed, even after all circuits for the coil of switch ASR are interrupted, for the time delay provided by resistor R5 and condenser Q5. Contacts ASR5 in closing complete a circuit for the coil of call stop switch CPR through closed contacts SC2 and MGT3 (switch MGT, FIG. 7, is unactuated since the NT1 contacts of at least the selected car are closed). This actuates switch CPR to close its contacts CPR1.

The continued approach of the car to the main landing causes the synchronous panel of its landing selector to approach the position at which its advancer carriage is stopped. This causes contacts SLS2 (FIG. 1) to open to release advanced advancer switch ADV to its unactuated condition closing contacts ADV2 (FIG. 2). In addition as this is occurring door zone contacts DZ (FIG. 2) are also closed in any well known manner. Ultimately the movement of the synchronous panel in relation to the advancer carriage causes the opening of contacts SLS1 (FIG. 1) to release brake and field switch H which stops the car at the main landing. In releasing to its unactuated condition switch H also closes contacts H4 (FIG. 2) to complete a circuit for the coil of door control switch DO through closed contacts CPR1, ADV2 and DZ. This actuates switch DO opening its contacts DO2 and DO3 (FIG. 1) and closing its contacts DO1 and DO4 (FIG. 1). As a result door motor armature DMA (FIG. 1) of the door operating means rotates in a direction which causes the car and its associated hoistway door at the main landing to operate to their opened positions. As the doors open, gate contacts GS2 are closed to cause the actuation of door open switch GH. This closes contacts GH2 (FIG. 2). Contacts MLU1 of main landing up switch MLU (FIG. 3) being closed at this time as explained in connection with the selection of car *b* at the main landing, the closing of contacts GH2 maintains a circuit for the coil of door control switch DO through closed contacts ASR4, MLU1, MGT1 and DZ until contacts ASR4 or MGT1 open. In addition, contacts GH6 (FIG. 5) close to cause the actuation of door open preference switch DOP through the completion of the circuit through contacts MLU3 and GH6.

Assume now that the car selected at the main landing with its doors open is car *a*. Also assume that before car *a* is dispatched upward, car *b* arrives at the main landing in response to a car call, as explained before. This time, however, its selected car switch SC*b* is prevented from being actuated by the open condition of contacts SC4*a* (FIG. 5) in the circuit of its coil. Its doors open nevertheless in the manner described for the opening of the doors of car *a* because call stop switch CPR*b* (FIG. 2) is actuated in response to the completion of the circuit through closed contacts XDO6*b* and CBS1*b*. Upon opening, these doors are also maintained open, like those of car *a*, through the operation of the circuit through closed contacts ASR4*b*, MLU1*b*, MGT1*b*, GH2*b* and DZ*b* (FIG. 2). In addition a second circuit for the coil of door open preference switch DOP (FIG. 5) is completed through contacts MLU3*b* and GH6*b*.

Assume now that while car *a* is still awaiting upward dispatch from the main landing, car *c* arrives thereat in response to the signal applied to its switch HCC1*c* (FIG. 11) through contacts PC2*c*, CAZ1*c* and HG1*c*. Since it is not responding to either a car or a landing call for the first landing neither car call stop switch CBS*c* (FIG. 11) nor hall call stop switch HS*c* (FIG. 10*b*) is actuated. In addition since selected car switch SC*c* (FIG. 5) of car *c* cannot be actuated in view of open contacts SC4*a* in the circuit of its coil, call stop switch CPR*c* cannot be actuated. Thus car *c* comes to a stop at the main landing without opening its doors.

At that time, assume car *a* receives a signal to start in the up direction. In preparing to move car *a* is caused to close its doors. This opens gate switch GS2*a* (FIG. 2) and releases door open switch GH*a* to its unactuated condition. Contacts GH6*a* (FIG. 5) open but door open preference switch DOP is maintained actuated through the circuit of contacts MLU3*b* and GH6*b*. Contacts GH5*a* (FIG. 5) also open to release selected car switch SC*a* to close contacts SC4*a* (FIG. 5).

Car *a* is now no longer selected and the selection means operates to select one of the other cars located at the main landing as the next to be dispatched therefrom. Since car *b* has its doors open the preference arrangement prevents the selection of car *c* in preference thereto. This is accomplished by the fact that the presence of car *b* at the main landing prepared for up travel with its doors opened causes door open preference switch DOP (FIG. 5) to be actuated through closed contacts MLU3*b* and GH6*b* as previously explained. The actuation of switch DOP opens contacts DOP1, DOP2, DOP3 and DOP4 (FIG. 5). This prevents the actuation of the selected car switch SC of any car whose doors are not opened since the only path for the coil of a selected car switch which is capable of being completed is through contacts GH5 of the respective car's door open switch GH and these can only be engaged if the doors of that car are opened. In consequence, upon the engagement of contacts SC4*a*, the coil of selected car switch SC*b* of car *b* is energized through the circuit including contacts SC4*a*, GH5*b*, MLU5*b*, SC5*c* and SC5*d*. This operates the switch to its actuated condition and car *b* becomes selected as the next car to be dispatched.

Dispatching of a selected car from the main landing during up traffic conditions depends upon a call being registered to which that car can respond. If such a call is in existence the car is dispatched a predetermined period, or time interval, after the dispatch of the preceding car. If no such call is in existence the car is dispatched upon the registration of such a call after the elapse of the dispatching interval. In order to understand how this operation is provided assume car *a* is the selected car at the main landing such that its selected car switch SC*a* (FIG. 5) is actuated. After the release of door open time switch NT*a* (FIG. 2) and the opening of contacts NT3*a* (FIG. 4) automatic start relay ASR*a* remains actuated because a circuit is completed to its coil through contacts MLU2*a*, GUD1*a* and ASR6*a* as well as through contacts DGD7*a*, HJ3*a* and ASR6*a*. Upon a landing or car call being registered to which car *a* can respond call above switch HJ*a* (FIG. 4) is actuated in response to the completion of the circuit through contacts HJX1*a* of hall call above switch HJX*a* (FIG. 10*b*) or the circuit through contacts HG2*a* of car call above switch HG*a* (FIG. 11). This opens contacts HJ3*a* (FIG. 4) removing one of the circuits for the coil of switch ASR*a*. It also closes contacts HJ5*a* (FIG. 7) to prepare a circuit for the coils of up dispatch switches GUD*a*, etc.

As the preceding car left the main landing it completed a circuit for the coil of up dispatch timer switch FUT (FIG. 7) through its respective contacts ASR1 and SC1. Up dispatch time switch FUT remains actuated after contacts SC1 of the preceding car separate for the time delay provided by resistors R9 and R9' and condenser Q9. With contacts UPR2 open, this time delay is preferably about 30 seconds, although more or less delay is possible if desired. Upon the elapse of this delay time, switch FUT releases to close its contacts FUT1 (FIG. 7). This completes the circuit for the coils of up dispatch switches GUD*a*, etc. through contacts SC6*a*, HJ5*a*, ASR7*a* and FUT1. In response switch GUD*a* is actuated to open its contacts GUD1*a* (FIG. 4) to interrupt the only completed circuit for the coil of automatic start switch ASR*a*. Although the other up dispatch switches GUD*b*, GUD*c* and GUD*d* are also actuated to open their contacts GUD1*b*, etc., this occurs without effect since such contacts are in parallel with their respective closed contacts SC3*b*, etc. Upon the opening of contacts GUD1*a* and after the time delay provided by resistor R5*a* and condenser Q5*a* switch ASR*a* releases. This closes contacts ASR1*a* (FIG. 7) to cause up dispatch timer switch FUT to operate again to its actuated condition. It also opens contacts ASR5*a* (FIG. 2) to release switch CPR*a* (contacts XDO6*a* opening a short time after the assumed release of switch NT). Also contacts ASR4*a* (FIG. 2) open and this in conjunction with the opening of contacts CPR1*a* (FIG. 2) releases door control switch DO*a*. As a result the doors close and door open switch GH*a* (FIG. 2) releases to open contact GH5*a* (FIG. 5). This releases selected car switch SC*a* and enables the selection of another car. In the meantime, contacts ASR3*a* (FIG. 1) close to complete a circuit for the coil of pawl magnet switch PM*a*. Upon actuation switch PM*a* closes contacts PM1*a* (FIG. 1) to enable the excitation of advancer carriage brush motor armature BMA*a* when the doors of car *a* close. In response the brush motor rotates to move the advancer carriage which closes contacts SLS1*a* (FIG. 1) causing the actuation of field and brake switch H*a* and up switch U*a*, the closing of contacts H2*a*, U2*a* and U3*a* (FIG. 1) the lifting of the brake of car *a* and the energization of its generator field GF*a* (FIG. 1) causing it to move in the up direction.

If up dispatch timer switch FUT releases to close contacts FUT1 before the registration of a call to which car *a* can respond, the up dispatch switches GUD*a*, etc. remain deenergized and both circuits for the coil of automatic start switch ASR*a* remain completed. Upon the registration of such a call contacts HJ3*a* immediately open to interrupt one of these circuits as previously explained. Contacts HJ5*a* immediately close to cause the actuation of the up dispatch switches GUDa, etc. and the opening of contacts GUD1a. Thus under these circumstances the dispatch of the car awaits the registration of such a call even though the dispatch interval has expired.

The system operates to restore itself from functioning in a manner suitable to up traffic conditions to the manner in which it functioned before the operation of up traffic switch UPR whenever the time delay provided loaded car up timing switch LCUT (FIG. 8) by resistor R2 and condenser Q2 elapses without a car traveling up from the main landing more than 60% loaded. In these circumstances, none of the load dispatch switches LDSa, etc. (FIG. 3) operate to close their contacts LDS1a, etc. (FIG. 8) during this time. As a result, contacts LCU1 (FIG. 8) do not close to reestablish the time delay provided by resistor R2 and Q2 and loaded car up timing switch LCUT releases to open contacts LCUT1 (FIG. 8). This releases up traffic switch UPR and restores the system to its previous manner of operation.

Various modifications to the above described system are possible without departing in any way from the spirit of the invention. It is intended therefore that the embodiment specifically described not be considered exclusive or in any sense limiting.

What is claimed is:

1. An elevator control system for a plurality of cars operating in two directions of travel to serve a plurality of landings in a building including a main landing by starting in response to the operation of individual starting switch means and stopping in response to and canceling calls for travel in both directions registered in said cars and at said landings, said system segregating said landings into a plurality of groups of landings so as effectively to divide the building into a plurality of zones and comprising control means including assignment switch means individual to each car, each being actuatable upon its respective car occupying a zone in which it is the only car present, zone switch means individual to each zone, each being actuatable upon a car occupying its respective zone, each said zone switch means when actuated being effective to limit the response to landing calls registered in that zone to a car located therein, each said unactuated assignment switch means being effective in the absence of a predetermined traffic condition to cause the starting switch means of its respective car to cause movement of the car toward a zone whose zone switch means is unactuated, thus causing said cars to distribute themselves into the various zones, wherein the improvement comprises traffic measuring means individual to specific zones, each being actuated in response to the continuous registration for a predetermined period of time of a landing call in its associated zone provided that during such period no landing call for travel in the same direction as said continuously registered one is cancelled in the associated zone, each said actuated traffic measuring means operating to remove the limitation on the response to landing calls provided by only the zone switch means for its associated zone whereby the starting switch means of a car outside said zone is enabled to start movement of its associated car toward said zone to respond to landing calls registered therein notwithstanding another car is occupying said zone.

2. An elevator control system according to claim 1 wherein each said actuated traffic measuring means operates to prevent the starting switch means of a car whose assignment switch means is unactuated from causing movement of said car toward a zone whose zone switch means is unactuated, and wherein in the absence of said predetermined traffic condition each said actuated traffic measuring means operates to cause the starting switch means of a car whose assignment switch means is unactuated to cause movement of said car toward the zone associated with said actuated traffic measuring means.

3. An elevator control system according to claim 2 wherein said landing calls include both up and down landing calls and wherein each said traffic measuring means is actuated either in response to an up landing call in its associated zone being in continuous registration for an uninterrupted period during which no up landing call is cancelled in said zone or in response to a down landing call in its associated zone being in continuous registration for an uninterrupted period during which no down landing call is cancelled in said zone.

4. An elevator control system according to claim 3 wherein each said actuated traffic measuring means is restored to its unactuated state either upon the cancellation of an up landing call in its associated zone if it was actuated in response to said continuous registration of an up landing call or upon the cancellation of a down landing call in its associated zone if it was actuated in response to said continuous registration of a down landing call.

5. An elevator control system according to claim 1 wherein each said traffic measuring means removes the limitation in the response to landing calls provided by the zone switch means for its associated zone by enabling the starting switch means of a car in a nearby occupied zone to start said car in response to landing calls in said associated zone.

6. An elevator control system according to claim 5 wherein each said traffic measuring means removes the limitation in the response to landing calls provided by the zone switch means for its associated zone by enabling the starting switch means of a car in the next occupied zone below said associated zone to start its car in response to landing calls in said associated zone.

7. An elevator control system according to claim 6 wherein if there is no occupied zone below said associated zone the traffic measuring means for said associated zone enables the starting means of a car in the next occupied zone above said associated zone to start its car to respond to landing calls in said associated zone.

8. An elevator control system according to claim 7 wherein each said actuated traffic measuring means operates to prevent the starting switch means of a car whose assignment switch is unactuated from causing movement of said car toward a zone whose zone switch means is unactuated, and wherein in the absence of said predetermined traffic condition each said actuated traffic measuring means operates to cause the starting switch means of a car whose assignment switch means is unactuated to cause movement of said car toward the zone associated with said actuated traffic measuring means.

9. An elevator control system according to claim 8 including a load weighing device individual to each car, each operating in response to the presence of a specific passenger load in its respective car and an up traffic switch means and wherein said predetermined traffic condition is one in which predominantly all the passengers are up travelers who commenced traveling in the system by entering a car at the main landing, said traffic condition being signified by the actuation of said up traffic switch means in response to the upward departure from said main landing within a predetermined period of two cars, each carrying a specific passenger load as signified by the operation of its respective load weighing device.

10. An elevator control system in accordance with claim 9 including dispatching equipment operating in response to the actuation of said up traffic switch means to cause the dispatching of cars from said main landing at regular time intervals provided that at the end of an interval a call is in registration to which the car to be dispatched is capable of responding otherwise said car is dispatched upon the registration of the first call to which it can respond after the elapse of the dispatching interval for said car.

11. An elevator control system according to claim 10 wherein said actuated up traffic switch means prevents the actuation of the assignment switch means of said cars in predetermined ones of said specific zones notwithstanding any car may be the only one occupying a predetermined one of said zones.

12. An elevator control system according to claim 11 wherein said actuated up traffic switch means operates the starting switch means of all cars whose assignment switch means is unactuated to cause movement of said cars to said main landing.

13. An elevator control system according to claim 12 wherein said actuated up traffic switch prevents the actuation of any of the zone switch means of said specific zones unless an up traveling car is occupying that zone.

14. An elevator control system according to claim 13 including individual car door means for each car, hoistway door means for each car at each landing at which the associated car can stop, door operating means for each car for operating its associated car and hoistway door means between opened and closed positions, while its associated car is located at a landing, control circuit means preventing each car's door operating means from operating its associated car and hoistway door means to said opened positions at any landing unless the car is responding to a call at that landing, said control circuit means operating in response to the arrival of a car at the main landing and the opening of said car door means and its associated hoistway door means thereat to maintain both said door means in their opened positions until the starting switch means of said car is operated, and selection means selecting which of a plurality of cars located at the main landing is the next to be dispatched, said selection means including a preference arrangement whereby a car whose car and associated hoistway door means are in their opened positions is selected in preference to a car whose car and associated hoistway door means are in their closed positions.

References Cited

UNITED STATES PATENTS

| | | | |
|---|---|---|---|
| 3,378,107 | 4/1968 | Madison | 187—29 |
| 3,504,771 | 4/1970 | Suozzo et al. | 187—29 |

ORIS L. RADER, Primary Examiner

W. E. DUNCANSON, JR., Assistant Examiner